(12) United States Patent
Chen

(10) Patent No.: US 10,085,286 B2
(45) Date of Patent: Sep. 25, 2018

(54) METHOD AND SYSTEM FOR CONDUCTING RANDOM ACCESS ON SMALL CELL UNDER DUAL CONNECTIVITY

(71) Applicant: ZTE Corporation, Shenzhen, Guangdong (CN)

(72) Inventor: Zhongming Chen, Shenzhen (CN)

(73) Assignee: ZTE Corporation, Shenzhen, Guangdong (CN)

( * ) Notice: Subject to any disclaimer, the term of this patent is extended or adjusted under 35 U.S.C. 154(b) by 236 days.

(21) Appl. No.: 15/023,430

(22) PCT Filed: Apr. 22, 2014

(86) PCT No.: PCT/CN2014/075936
§ 371 (c)(1),
(2) Date: Mar. 21, 2016

(87) PCT Pub. No.: WO2014/177002
PCT Pub. Date: Nov. 6, 2014

(65) Prior Publication Data
US 2016/0205705 A1    Jul. 14, 2016

(30) Foreign Application Priority Data

Sep. 27, 2013   (CN) .......................... 2013 1 0452155

(51) Int. Cl.
*H04W 74/08* (2009.01)
*H04W 88/06* (2009.01)

(52) U.S. Cl.
CPC ........ *H04W 74/0833* (2013.01); *H04W 88/06* (2013.01)

(58) Field of Classification Search
CPC ......... H04W 74/0833; H04W 56/0045; H04W 24/00; H04W 72/00; H04W 72/042;
(Continued)

(56) References Cited

U.S. PATENT DOCUMENTS

2012/0300714 A1    11/2012   Ng
2013/0242892 A1*   9/2013    Ye ..................... H04W 74/0833
                                                              370/329
(Continued)

FOREIGN PATENT DOCUMENTS

CN    101212796 A    7/2008
CN    102573101 A    7/2012
(Continued)

OTHER PUBLICATIONS

Supplementary European Search Report in European application No. 14791549.0, dated Nov. 23, 2016, 14 pgs.

(Continued)

*Primary Examiner* — Jamal Javaid
*Assistant Examiner* — Rosene Clark
(74) *Attorney, Agent, or Firm* — Cooper Legal Group, LLC

(57) ABSTRACT

Disclosed is a method for conducting random access on a small cell under dual connectivity. The method includes that: a User Equipment (UE) sends a dedicated random access preamble corresponding to a designated small cell to a base station to which the designated small cell belongs on the designated small cell; and the UE receives a random access response message sent by a base station to which a master control cell in dual connectivity belongs or the base station to which the designated small cell belongs. The present disclosure also discloses a system for conducting random access on a small cell under dual connectivity, a base station, a UE and a computer storage medium.

18 Claims, 11 Drawing Sheets

(58) Field of Classification Search
CPC ........... H04W 72/0453; H04W 74/006; H04W 72/1289; H04W 48/12; H04W 88/06; H04W 24/02; H04W 24/10
See application file for complete search history.

(56) References Cited

U.S. PATENT DOCUMENTS

| | | | |
|---|---|---|---|
| 2013/0322339 A1* | 12/2013 | Ohta | H04L 5/001 370/328 |
| 2014/0044074 A1 | 2/2014 | Chen | |
| 2014/0169323 A1* | 6/2014 | Park | H04W 72/1289 370/329 |
| 2014/0335882 A1* | 11/2014 | Lee | H04W 76/025 455/452.2 |
| 2014/0369322 A1 | 12/2014 | Fwu | |
| 2015/0071198 A1 | 3/2015 | Deng | |
| 2016/0066228 A1* | 3/2016 | Fan | H04W 36/08 370/331 |
| 2016/0183323 A1* | 6/2016 | Rahman | H04W 74/0833 370/329 |
| 2016/0295613 A1* | 10/2016 | Wager | H04L 41/0813 |
| 2016/0330705 A1 | 11/2016 | Fwu et al. | |

FOREIGN PATENT DOCUMENTS

| | | |
|---|---|---|
| CN | 102711273 A | 10/2012 |
| CN | 103327637 A | 9/2013 |
| JP | 201342262 A | 2/2013 |
| JP | 2013187835 A | 9/2013 |
| WO | 2012129998 A1 | 10/2012 |
| WO | 2012134534 A1 | 10/2012 |
| WO | 2013140240 A1 | 9/2013 |

OTHER PUBLICATIONS

International Search Report in international application No. PCT/CN2014/075936, dated Jul. 16, 2014, 5 pgs.

English Translation of the Written Opinion of the International Search Authority in international application No. PCT/CN2014/075936, dated Jul. 16, 2014, 26 pgs.

The Partial Supplementary European Search Report in European application No. 14791549.0, dated Aug. 19, 2016, 9 pgs.

* cited by examiner

METHOD AND SYSTEM FOR CONDUCTING RANDOM ACCESS ON SMALL CELL UNDER DUAL CONNECTIVITY

TECHNICAL FIELD

The present disclosure relates to communications and in particular to a method and a system for conducting random access on a small cell under dual connectivity.

BACKGROUND

In a Long Term Evolution (LTE) system, a User Equipment (UE) in a connected state needs to implement uplink synchronization and downlink synchronization with a base station before sending data to the base station. Here, the uplink synchronization is implemented by executing a random access process (a sending Time Advance (TA) is acquired at the same time), and the downlink synchronization is implemented by measuring a certain cell by the UE, wherein the TA is mainly configured for the UE to determine the time for sending data.

The UE may start an uplink Time Alignment Timer (TAT) after implementing uplink synchronization. If the UE receives the TA sent by the base station before timeout of the TAT, the UE considers that uplink synchronization is kept between the UE and the base station; otherwise the UE considers that it gets out of uplink synchronization with the base station. The UE needs to re-implement uplink synchronization if being required to send data to the base station again after getting out of uplink synchronization. There is only one carrier in a cell in an LTE system, so that there is only one TA.

FIG. 1 is a flowchart showing random access in an LTE system. As shown in FIG. 1, a random access process may be initiated by sending a Physical Downlink Control Channel (PDCCH) order or Medium Access Control (MAC) layer signalling by a base station, as shown in Step 0 in FIG. 1. When a dedicated random access preamble may be allocated to UE by virtue of the PDCCH order or a Radio Resource Control (RRC) signalling, the random access is called non-conflicting random access. In this case, the dedicated random access preamble may be allocated only by the base station, and the dedicated random access preamble may be configured for the UE through the PDCCH order or a handover command. When the UE needs to select a random access preamble, the random access is conflicting random access. In this case, Step 0 is not executed, and instead Step 1 is directly executed.

A random access resource selected by the UE includes the random access preamble, a time and frequency domain resource of a Physical Random Access Channel (PRACH), or the like. A non-conflicting random access process is implemented by allocating the dedicated random access preamble to the UE by a network side without a resolution process of resolving a conflict, so that a processing flow, as shown in FIG. 1, includes two steps, i.e. Step 0~Step 1. A conflicting random access process, as shown in FIG. 1, includes four steps, i.e. Step 1~Step 4, wherein Step 3 and Step 4 are executed to resolve a conflict.

After introduction of a Carrier Aggregation (CA) technology, the UE in a connected state may simultaneously communicate with a source base station through multiple Component Carriers (CCs). After introduction of the CA technology, a Primary Cell (Pcell) and a Secondary Cell (Scell) are also introduced, a serving cell identifier may also be configured for each serving cell, the Scell also has an independent Scell identifier, and the Scell identifier of the Scell is the same as a serving cell identifier of the corresponding Pcell. Due to increase of data traffic, the number of Scells may be increased, for example, to 4, and correspondingly, an application condition may be liberalized. For example, Remote Radio Head (RRH) and repeater technologies may be supported in an uplink, and multiple TAs may be introduced to solve a problem if the problem cannot be solved by one TA. In order to facilitate management, serving cells employing the same TA are divided into a TA group, a TA group including a Pcell is called a PTAG, and a TA group without a Pcell is called an STAG. Timing for UE to execute random access on a Pcell in a PTAG is the same as that for executing random access when there is only one TA, and there is only one time for execution of random access on an STAG, i.e. upon receipt of notification from a network side. That is, there is only a conflicting random access process.

At present, due to shortage of spectrum resources and sharp increase of heavy-traffic services of mobile users, a requirement on hotspot coverage with a high-frequency point such as 3.5 GHz becomes increasingly high. In order to improve user throughput and enhance mobility, a scenario where a low-power node is adopted becomes a new application scenario. However, a high-frequency point has great signal attenuation and has a very small coverage. The small cell of the high-frequency point is not co-sited with an existing cell, so that many corporations and operating companies prefer to seek for a novel enhancement solution, one of which is a dual connectivity technology. Under dual connectivity, the UE may keep data connections with more than two base stations at the same time, but a control plane connection only includes a connection with a cell of one base station, such as a macro cell.

At present, there is no technical solution for random access of UE on a small cell under dual connectivity.

SUMMARY

In order to solve the existing technical problems, the embodiments of the present disclosure provide a method and a system for conducting random access on a small cell under dual connectivity.

To this end, the technical solutions according to the embodiments of the present disclosure are implemented as follows.

The embodiments of the present disclosure provide a method for conducting random access on a small cell under dual connectivity, including:

a UE sends a dedicated random access preamble corresponding to a designated small cell to a base station to which the designated small cell belongs on the designated small cell; and the UE receives a random access response message sent by a base station to which a master control cell in the dual connectivity belongs or the base station to which the designated small cell belongs.

In the solution, before the step that the UE sends the dedicated random access preamble corresponding to the designated small cell to the base station to which the designated small cell belongs on the designated small cell, the method may further include that:

the UE determines the dedicated random access preamble corresponding to the designated small cell according to a negotiation result between the base station to which the master control cell in the dual connectivity belongs and the base station to which the designated small cell belongs and the notified designated small cell; or, the UE determines the designated small cell according to the negotiation result of the base station to which the master control cell in the dual connectivity belongs and the base station to which the designated small cell belongs and a notified dedicated random access preamble parameter corresponding to the dedicated random access preamble; and the negotiation result may include respective dedicated random access preamble resources of the base station to which the master control cell belongs and the base station to which the designated small cell belongs.

The embodiments of the present disclosure also provide a method for conducting random access on a small cell under dual connectivity, including:

a base station to which a master control cell in the dual connectivity belongs notifies UE to initiate a random access process on a designated small cell, and/or notifies a dedicated random access preamble parameter corresponding to a dedicated random access preamble of the designated small cell.

In the solution, the step that the base station notifies the UE to initiate the random access process on the designated small cell, and/or notifies the dedicated random access preamble parameter corresponding to the dedicated random access preamble may be implemented as follows:

the base station to which the master control cell belongs notifies the UE to initiate the random access process on the designated small cell, and/or notifies the dedicated random access preamble parameter corresponding to the dedicated random access preamble through a PDCCH order, a MAC signalling or an RRC signalling.

In the solution, before the step that the base station to which the master control cell belongs notifies the UE to initiate the random access process on the designated small cell, and/or notifies the UE of the dedicated random access preamble parameter corresponding to the dedicated random access preamble, the method may further include that:

the base station to which the master control cell belongs sends a negotiation result including respective dedicated random access preamble resources of the base station to which the master control cell belongs and a base station to which the designated small cell belongs to the UE.

In the solution, the method may further include that:

the base station to which the master control cell belongs notifies that the UE initiates the random access process on the designated small cell and the corresponding dedicated random access preamble parameter to the base station to which the designated small cell belongs.

In the solution, the dedicated random access preamble parameter may be a dedicated random access preamble index.

The embodiments of the present disclosure further provide a method for conducting random access on a small cell under dual connectivity, including:

a base station to which a master control cell in dual connectivity belongs notifies UE to initiate a random access process on a designated small cell, and/or notifies a dedicated random access preamble parameter corresponding to a dedicated random access preamble;

the UE sends the dedicated random access preamble corresponding to the designated small cell to a base station to which the designated small cell belongs on the designated small cell after receiving the notification; and the UE receives a random access response message sent by the base station to which the master control cell belongs or the base station to which the designated small cell belongs.

In the solution, the step that the base station notifies the UE to initiate the random access process on the designated small cell, and/or notifies the dedicated random access preamble parameter corresponding to the dedicated random access preamble may be implemented as follows:

the base station to which the master control cell belongs notifies the UE to initiate the random access process on the designated small cell, and/or notifies the dedicated random access preamble parameter corresponding to the dedicated random access preamble through a PDCCH order, a MAC signalling or an RRC signalling.

In the solution, before the step that the base station to which the master control cell belongs notifies the UE to initiate the random access process on the designated small cell, and/or notifies the UE of the dedicated random access preamble parameter corresponding to the dedicated random access preamble, the method may further include that:

the base station to which the master control cell belongs negotiates with the base station to which the designated small cell belongs to obtain respective dedicated random access preamble parameters, and sends a negotiation result to the UE;

correspondingly, before the step that the UE sends the dedicated random access preamble corresponding to the designated small cell to the base station to which the designated small cell belongs on the designated small cell, the method may further include that:

the UE determines the dedicated random access preamble corresponding to the designated small cell according to the negotiation result and the notified designated small cell; or, the UE determines the designated small cell according to the negotiation result and the notified dedicated random access preamble parameter corresponding to the dedicated random access preamble; and the negotiation result may include respective dedicated random access preamble resources of the base station to which the master control cell belongs and the base station to which the designated small cell belongs.

In the solution, the dedicated random access preamble parameter may be a dedicated random access preamble index.

In the solution, before the step that the UE sends the dedicated random access preamble corresponding to the designated small cell to the base station to which the designated small cell on the designated small cell, the method may further include that:

the base station to which the master control cell belongs notifies that the UE initiates the random access process on the designated small cell and the corresponding dedicated random access preamble parameter to the base station to which the designated small cell belongs.

In the solution, before the step that the UE receives the random access response message sent by the base station to which the master control cell belongs or the base station to which the designated small cell belongs, the method may further include that:

the base station to which the designated small cell belongs calculates a TA value after receiving the dedicated random access preamble, and notifies, of the TA value, the base station to which the master control cell belongs after calculation, and the base station to which the master control cell belongs sends the random access response message to the UE after receiving the notification; or, the base station to which the designated small cell belongs calculates a TA value after receiving the dedicated random access preamble, and sends the random access response message to the UE after calculation.

The embodiments of the present disclosure further provide a method for conducting random access on a small cell under dual connectivity, including:

a UE sends a dedicated random access preamble selected by itself to a base station to which a designated small cell belongs on the designated small cell;

the UE sends a scheduled transmission message to the base station to which the designated small cell belongs through a base station to which a master control cell belongs after the UE receives a random access response message sent by the base station to which the master control cell in dual connectivity belongs; and the base station to which the designated small cell belongs returns a conflicting resolution message to the UE through the base station to which the master control cell belongs.

In the solution, before the step that the UE sends the dedicated random access preamble selected by itself to the base station to which the designated small cell belongs on the designated small cell, the method may further include that:

the base station to which the master control cell belongs notifies the UE to initiate a random access process on the designated small cell.

In the solution, the step that the base station to which the master control cell belongs notifies the UE to initiate the random access process on the designated small cell may be implemented as follows:

the base station to which the master control cell belongs notifies the UE to initiate the random access process on the designated small cell through a PDCCH order, a MAC signalling or an RRC signalling.

In the solution, the step that the UE sends the scheduled transmission message to the base station to which the designated small cell belongs through the base station to which the master control cell belongs may be implemented as follows:

the base station to which the master control cell belongs forwards the scheduled transmission message to the base station to which the designated small cell belongs according to an identifier of the designated small cell in the received scheduled transmission message.

In the solution, the step that the base station to which the designated small cell belongs returns the conflicting resolution message to the UE through the base station to which the master control cell belongs may be implemented as follows:

the base station to which the designated small cell belongs sends the conflicting resolution message to the base station to which the master control cell belongs after the conflicting resolution message is generated; and the base station to which the master control cell belongs forwards the conflicting resolution message to the UE according to the identifier of the designated small cell and an identifier of the UE in the received conflicting resolution message.

The embodiments of the present disclosure further provide a UE, including: a sending module and a receiving module, wherein the sending module may be configured to send a dedicated random access preamble corresponding to a designated small cell to a base station to which the designated small cell belongs on the designated small cell; and the receiving module may be configured to receive a random access response message sent by a base station to which a master control cell belongs or the base station to which the designated small cell belongs.

In the solution, the UE may further include: a determination module, configured to determine the dedicated random access preamble corresponding to the designated small cell according to a negotiation result between the base station to which the master control cell in dual connectivity belongs and the base station to which the designated small cell belongs and the notified designated small cell; or, determine the designated small cell according to the negotiation result between the base station to which the master control cell in the dual connectivity belongs and the base station to which the designated small cell belongs and a notified dedicated random access preamble parameter corresponding to the dedicated random access preamble; and the negotiation result may include respective dedicated random access preamble resources of the base station to which the master control cell belongs and the base station to which the designated small cell belongs.

The embodiments of the present disclosure also provide a base station, including a storage module, wherein the base station further includes: a notification module, configured to notify a UE to initiate a random access process on a designated small cell, and/or notify a dedicated random access preamble parameter corresponding to a dedicated random access preamble of the designated small cell.

In the solution, the notification module may further be configured to send, to the UE, a negotiation result including respective dedicated random access preamble resources of a base station to which a master control cell belongs and a base station to which the designated small cell belongs.

In the solution, the notification module may further be configured to notify a base station to which the designated small cell belongs of the UE initiating the random access process on the designated small cell and the corresponding dedicated random access preamble parameter.

The embodiments of the present disclosure further provide a system for conducting random access on a small cell under dual connectivity, including: a first base station, first UE and a second base station, wherein the first base station is a base station to which a master control cell in dual connectivity belongs, and is configured to notify the first UE to initiate a random access process on a designated small cell, and/or notify a dedicated random access preamble parameter corresponding to a dedicated random access preamble; and the first UE is configured to send the dedicated random access preamble corresponding to the designated small cell to the second base station to which the designated small cell belongs on the designated small cell after receiving the notification from the first base station, and is configured to receive a random access response message sent by the first base station or the second base station.

In the solution, when the first base station notifies the first UE to initiate the random access process on the designated small cell, and/or notifies the first UE of the dedicated random access preamble parameter corresponding to the dedicated random access preamble, the first base station may further be configured to negotiate with the second base station to obtain respective dedicated random access preamble parameters, and send a negotiation result to the first UE; and correspondingly, the first UE may further be configured to, before sending the dedicated random access preamble corresponding to the designated small cell to the base station to which the designated small cell belongs on the designated small cell, determine the dedicated random access preamble corresponding to the designated small cell according to the negotiation result and the notified designated small cell; or, determine the designated small cell according to the negotiation result and the notified dedicated random access preamble parameter corresponding to the dedicated random access preamble.

In the solution, the first base station may further be configured to notify the second base station of the first UE initiating the random access process on the designated small cell and of the corresponding dedicated random access preamble parameter.

In the solution, the second base station may be configured to calculate a TA value after receiving the dedicated random access preamble, and notify the first base station of the TA value after calculation;

the first base station may further be configured to send the random access response message to the first UE after receiving the notification from the second base station; or, the second base station may further be configured to calculate a TA value after receiving the dedicated random access preamble, and send the random access response message to the first UE after calculation.

The embodiments of the present disclosure further provide a system for conducting random access on a small cell under dual connectivity, including: a third base station, a second UE and a fourth base station, wherein the second UE is configured to send a dedicated random access preamble selected by itself to the fourth base station to which a designated small cell belongs on the designated small cell, send a scheduled transmission message to the fourth base station through the third base station after receiving a random access response message sent by the third base station to which a master control cell in dual connectivity belongs, and receive a conflicting resolution message returned by the fourth base station; and the fourth base station is configured to return the conflicting resolution message to the second UE through the third base station.

In the solution, the third base station may be configured to notify the second UE to initiate a random access process on the designated small cell; and correspondingly, the second UE may be configured to send the dedicated random access preamble selected by itself to the fourth base station on the designated small cell after receiving the notification sent by the third base station.

The embodiments of the present disclosure further provide a computer storage medium including a set of instructions configured to, when being executed, cause at least one processor to execute the abovementioned methods for conducting random access on the small cell under the dual connectivity.

According to the method and system for conducting random access on the small cell under the dual connectivity provided by the embodiments of the present disclosure, the UE sends the dedicated random access preamble corresponding to the designated small cell to the base station to which the designated small cell belongs on the designated small cell, and the UE receives the random access response message sent by the base station to which the master control cell in the dual connectivity belongs or the base station to which the designated small cell belongs to implement the random access process; or, the UE sends the dedicated random access preamble selected by itself to the base station to which the designated small cell belongs on the designated small cell, the UE sends the scheduled transmission message to the base station to which the designated small cell belongs through the base station to which the master control cell belongs after receiving the random access response message sent by the base station to which the master control cell in the dual connectivity belongs, and the base station to which the designated small cell belongs returns the conflicting resolution message to the UE through the base station to which the master control cell belongs to implement the random access process. As such, the UE and the small cell may smoothly implement the random access process under the dual connectivity, so that the UE may send and receive data on the small cell, and the case that the small cell is unavailable is avoided.

BRIEF DESCRIPTION OF THE DRAWINGS

In the drawings (which may not be drawn to scale), similar reference signs may describe similar parts in the different views. Similar reference signs with different suffix letters may represent different examples of the similar parts. The drawings generally show each embodiment discussed in the present disclosure not restrictively but exemplarily.

DETAILED DESCRIPTION

In each embodiment of the present disclosure, a UE sends a dedicated random access preamble corresponding to a designated small cell to a base station to which the designated small cell belongs on the designated small cell, and the UE receives a random access response message sent by a base station to which a master control cell belongs or the base station to which the designated small cell belongs, thereby implementing a random access process; or, the UE sends a dedicated random access preamble selected by itself to the base station to which the designated small cell belongs on the designated small cell, the UE sends a scheduled transmission message to the base station to which the designated small cell belongs through the base station to which the master control cell belongs after receiving the random access response message sent by the base station to which the master control cell belongs, and the base station to which the designated small cell belongs returns a conflicting resolution message to the UE through the base station to which the master control cell belongs, thereby implementing the random access process.

The present disclosure will be further described in detail below with reference to the drawings and specific embodiments.

Embodiment 1

Figure 1:
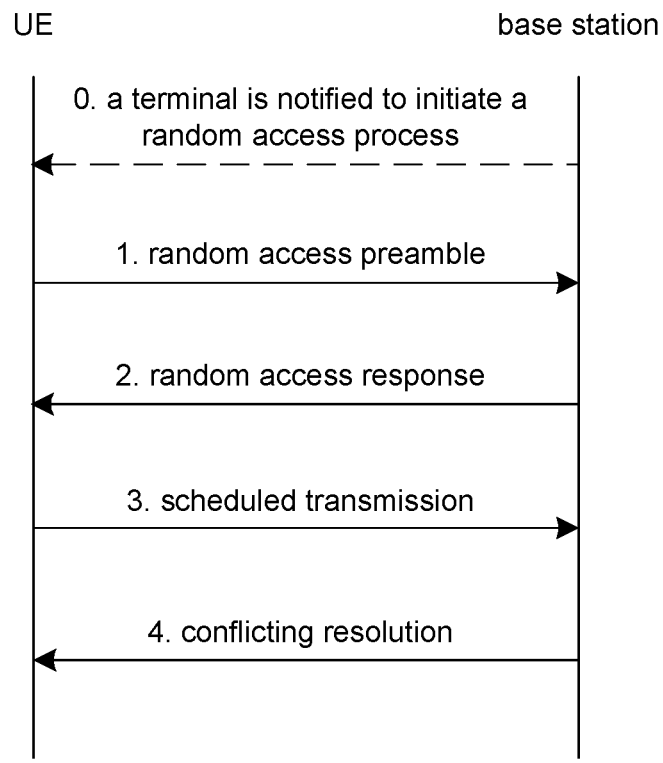
FIG. 1 is a flowchart showing random access in an existing LTE system.
Figure 2:
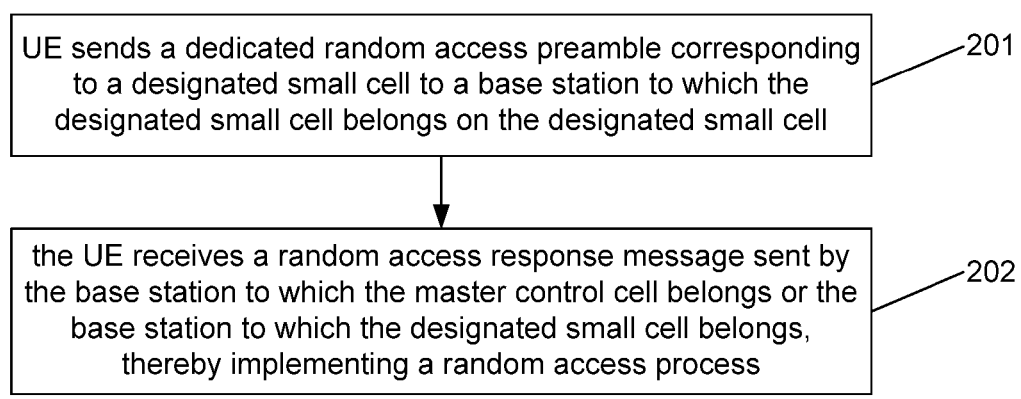
FIG. 2 is a flowchart showing a method for conducting random access on a small cell under dual connectivity according to embodiment 1 of the present disclosure.

A method for conducting random access on a small cell under dual connectivity in the embodiment of the present disclosure, as shown in FIG. 2, includes the following steps:

Step 201: a UE sends a dedicated random access preamble corresponding to a designated small cell to a base station to which the designated small cell belongs on the designated small cell.

Here, the dual connectivity refers to that the UE keeps data connections with more than two different cells which belong to different base stations at the same time.

Before step 201, the method may further include that:

the UE determines the dedicated random access preamble corresponding to the designated small cell according to a negotiation result between a base station to which a master control cell in the dual connectivity belongs and the base station to which the designated small cell belongs and a notified designated small cell; or, the UE determines the designated small cell according to the negotiation result between the base station to which the master control cell in the dual connectivity belongs and the base station to which the designated small cell belongs and a notified dedicated random access preamble parameter corresponding to the dedicated random access preamble.

Herein, the negotiation result includes respective dedicated random access preamble resources of the base station to which the master control cell belongs and the base station to which the designated small cell belongs.

The dedicated random access preamble parameter may specifically be a dedicated random access preamble index or the like.

Here, the UE may acquire the dedicated random access preamble corresponding to the dedicated random access preamble parameter according to a conventional art.

The step that the UE sends the dedicated random access preamble corresponding to the designated small cell to the base station to which the designated small cell belongs on the designated small cell is specifically implemented as follows:

the UE sends the dedicated random access preamble corresponding to the designated small cell to the base station to which the designated small cell belongs on a channel resource of the designated small cell.

Step 202: the UE receives a random access response message sent by the base station to which the master control cell belongs or the base station to which the designated small cell belongs, thereby implementing a random access process.

Embodiment 2

A method for conducting random access on a small cell under dual connectivity in the embodiment of the present disclosure includes that:

a base station to which a master control cell in dual connectivity belongs notifies UE to initiate a random access process on a designated small cell, and/or notifies a dedicated random access preamble parameter corresponding to a dedicated random access preamble of the designated small cell.

Here, the dual connectivity refers to that the UE keeps data connections with more than two different cells which belong to different base stations at the same time.

The master control cell is responsible for controlling and managing multiple established data connections to ensure data transmission speed and correctness.

The step that the base station notifies the UE to initiate the random access process on the designated small cell, and/or notifies the dedicated random access preamble parameter corresponding to the dedicated random access preamble is specifically implemented as follows:

the base station to which the master control cell belongs notifies the UE to initiate the random access process on the designated small cell, and/or notifies the dedicated random access preamble parameter corresponding to the dedicated random access preamble through a PDCCH order, a MAC signalling or an RRC signalling.

When the base station to which the master control cell belongs notifies the UE to initiate the random access process on the designated small cell, and/or notifies the UE of the dedicated random access preamble parameter corresponding to the dedicated random access preamble, before the step that the base station to which the master control cell belongs notifies the UE to initiate the random access process on the designated small cell, and/or notifies the UE of the dedicated random access preamble parameter corresponding to the dedicated random access preamble, the method may further include that:

the base station to which the master control cell belongs sends, to the UE, a negotiation result including respective dedicated random access preamble resources of the base station to which the master control cell belongs and a base station to which the designated small cell belongs.

Herein, the dedicated random access preamble parameter may specifically be a dedicated random access preamble index or the like.

The method further includes that: the base station to which the master control cell belongs notifies the base station to which the designated small cell belongs of that the UE initiates the random access process on the designated small cell and the corresponding dedicated random access preamble parameter.

Embodiment 3

Figure 3:
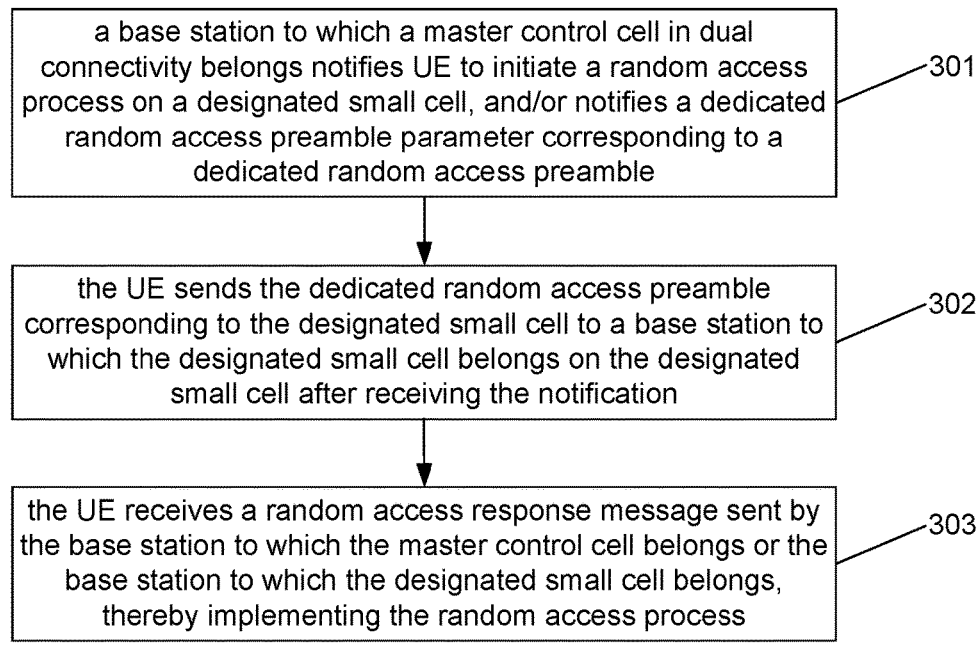
FIG. 3 is a flowchart showing a method for conducting random access on a small cell under dual connectivity according to embodiment 3 of the present disclosure.

A method for conducting random access on a small cell under dual connectivity in the embodiment of the present disclosure, as shown in FIG. 3, includes the following steps:

Step 301: a base station to which a master control cell in dual connectivity belongs notifies UE to initiate a random access process on a designated small cell, and/or notifies a dedicated random access preamble parameter corresponding to a dedicated random access preamble.

Here, the dual connectivity refers to that the UE keeps data connections with more than two different cells which belong to different base stations at the same time.

The master control cell is responsible for controlling and managing multiple established data connections to ensure data transmission speed and correctness.

The step that the base station notifies the UE to initiate the random access process on the designated small cell, and/or notifies the dedicated random access preamble parameter corresponding to the dedicated random access preamble is specifically implemented as follows:

the base station to which the master control cell belongs notifies the UE to initiate the random access process on the designated small cell, and/or notifies the dedicated random access preamble parameter corresponding to the dedicated random access preamble through a PDCCH order, a MAC signalling or an RRC signalling.

Step 302: the UE sends the dedicated random access preamble corresponding to the designated small cell to a base station to which the designated small cell belongs on the designated small cell after receiving such notification.

Here, before the step that the base station to which the master control cell belongs notifies the UE to initiate the random access process on the designated small cell, and/or notifies the dedicated random access preamble parameter corresponding to the dedicated random access preamble to the UE, the method may further include that:

the base station to which the master control cell belongs negotiates with the base station to which the designated small cell belongs about respective dedicated random access preamble parameters, and sends a negotiation result to the UE;

correspondingly, before the step that the UE sends the dedicated random access preamble corresponding to the designated small cell to the base station to which the designated small cell belongs on the designated small cell, the method may further include that:

the UE determines the dedicated random access preamble corresponding to the designated small cell according to the negotiation result and the notified designated small cell; or, the UE determines the designated small cell according to the negotiation result and the notified dedicated random access preamble parameter corresponding to the dedicated random access preamble; and the negotiation result includes respective dedicated random access preamble resources of the base station to which the master control cell belongs and the base station to which the designated small cell belongs.

The dedicated random access preamble parameter may specifically be a dedicated random access preamble index or the like.

Here, the UE may acquire the dedicated random access preamble corresponding to the dedicated random access preamble parameter according to the conventional art.

The step that the UE sends the dedicated random access preamble corresponding to the designated small cell to the base station to which the designated small cell on the designated small cell is specifically implemented as follows:

the UE sends the dedicated random access preamble corresponding to the designated small cell to the base station to which the designated small cell belongs on a channel resource of the designated small cell.

Before Step 302 is executed, the method may further include that:

the base station to which the master control cell belongs notifies that the UE initiates the random access process on the designated small cell and the corresponding dedicated random access preamble parameter to the base station to which the designated small cell belongs.

Step 303: the UE receives a random access response message sent by the base station to which the master control cell belongs or the base station to which the designated small cell belongs, thereby implementing the random access process.

Here, before the step that the UE receives the random access response message sent by the base station to which the master control cell belongs or the base station to which the designated small cell belongs, the method may further include that:

the base station to which the designated small cell belongs calculates a TA value after receiving the dedicated random access preamble, and notifies to the base station to which the master control cell belongs of the TA value after calculation, and the base station to which the master control cell belongs sends the random access response message to the UE after receiving the notification; or, the base station to which the designated small cell belongs calculates a TA value after receiving the dedicated random access preamble, and sends the random access response message to the UE after calculation.

Embodiment 4

Figure 4:
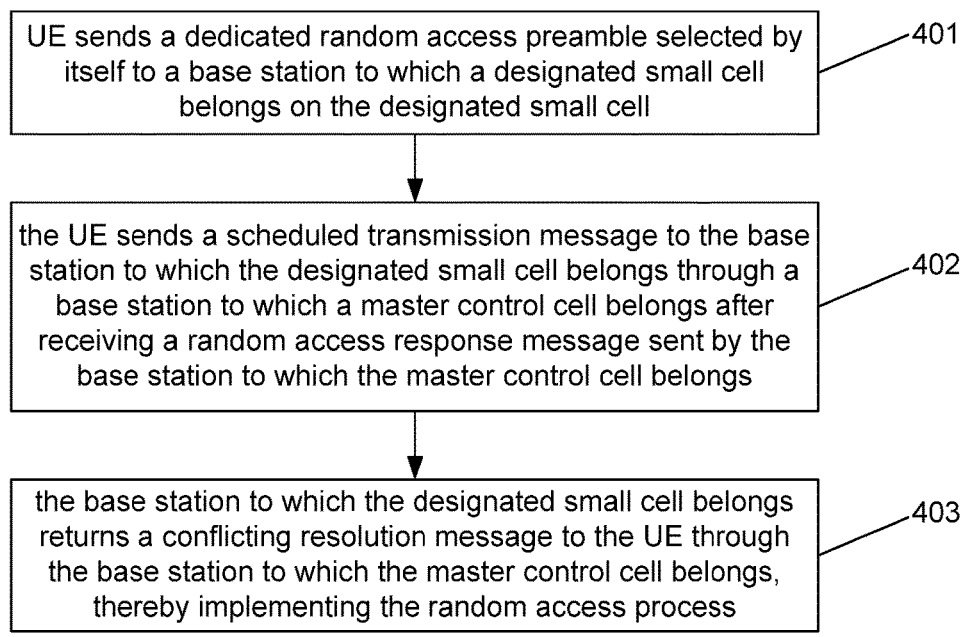
FIG. 4 is a flowchart showing a method for conducting random access on a small cell under dual connectivity according to embodiment 4 of the present disclosure.

Another method for conducting random access on a small cell under dual connectivity in the embodiment of the present disclosure, as shown in FIG. 4, includes the following steps:

Step 401: UE sends a dedicated random access preamble selected by itself to a base station to which a designated small cell belongs on the designated small cell.

Here, before Step 401 is executed, the method may further include that:

a base station to which a master control cell in dual connectivity belongs notifies the UE to initiate a random access process on the designated small cell.

Here, the dual connectivity refers to that the UE keeps data connections with more than two different cells which belong to different base stations at the same time.

The master control cell is responsible for controlling and managing multiple established data connections to ensure data transmission speed and correctness.

The step that the base station to which the master control cell belongs notifies the UE to initiate the random access process on the designated small cell is specifically implemented as follows:

the base station to which the master control cell belongs notifies the UE to initiate the random access process on the designated small cell through a PDCCH order, a MAC signalling or an RRC signalling.

A specific processing process of selecting the random access preamble by the UE is not a content the present disclosure concerns about.

The step that the UE selects the dedicated random access preamble selected by itself to the base station to which the designated small cell belongs on the designated small cell is specifically implemented as follows:

the UE sends the dedicated random access preamble selected by itself to the base station to which the designated small cell belongs on a channel resource of the designated small cell.

Step 402: the UE sends a scheduled transmission message to the base station to which the designated small cell belongs through the base station to which the master control cell belongs after receiving a random access response message sent by the base station to which the master control cell belongs.

Specifically, the UE sends the scheduled transmission message to the base station to which the master control cell belongs; and the base station to which the master control cell belongs forwards the scheduled transmission message to the base station to which the designated small cell belongs according to an identifier of the designated small cell in the received scheduled transmission message.

Here, the identifier of the designated small cell may specifically be an identifier capable of indicating that the random access process is performed on the designated small cell or the base station to which the designated small cell belongs, for example, a cell identifier of the designated small cell or an identifier of the base station to which the designated small cell belongs.

Step 403: the base station to which the designated small cell belongs returns a conflicting resolution message to the UE through the base station to which the master control cell belongs, thereby implementing the random access process.

Specifically, the base station to which the designated small cell belongs sends the conflicting resolution message to the base station to which the master control cell belongs after generating the conflicting resolution message; and the base station to which the master control cell belongs forwards the conflicting resolution message to the UE according to the identifier of the designated small cell and an identifier of the UE in the received conflicting resolution message.

Herein, the identifier of the designated small cell may specifically be an identifier capable of indicating that the random access process is performed on the designated small cell or the base station to which the designated small cell belongs, for example, the cell identifier of the designated small cell or the identifier of the base station to which the designated small cell belongs.

Embodiment 5

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 5:
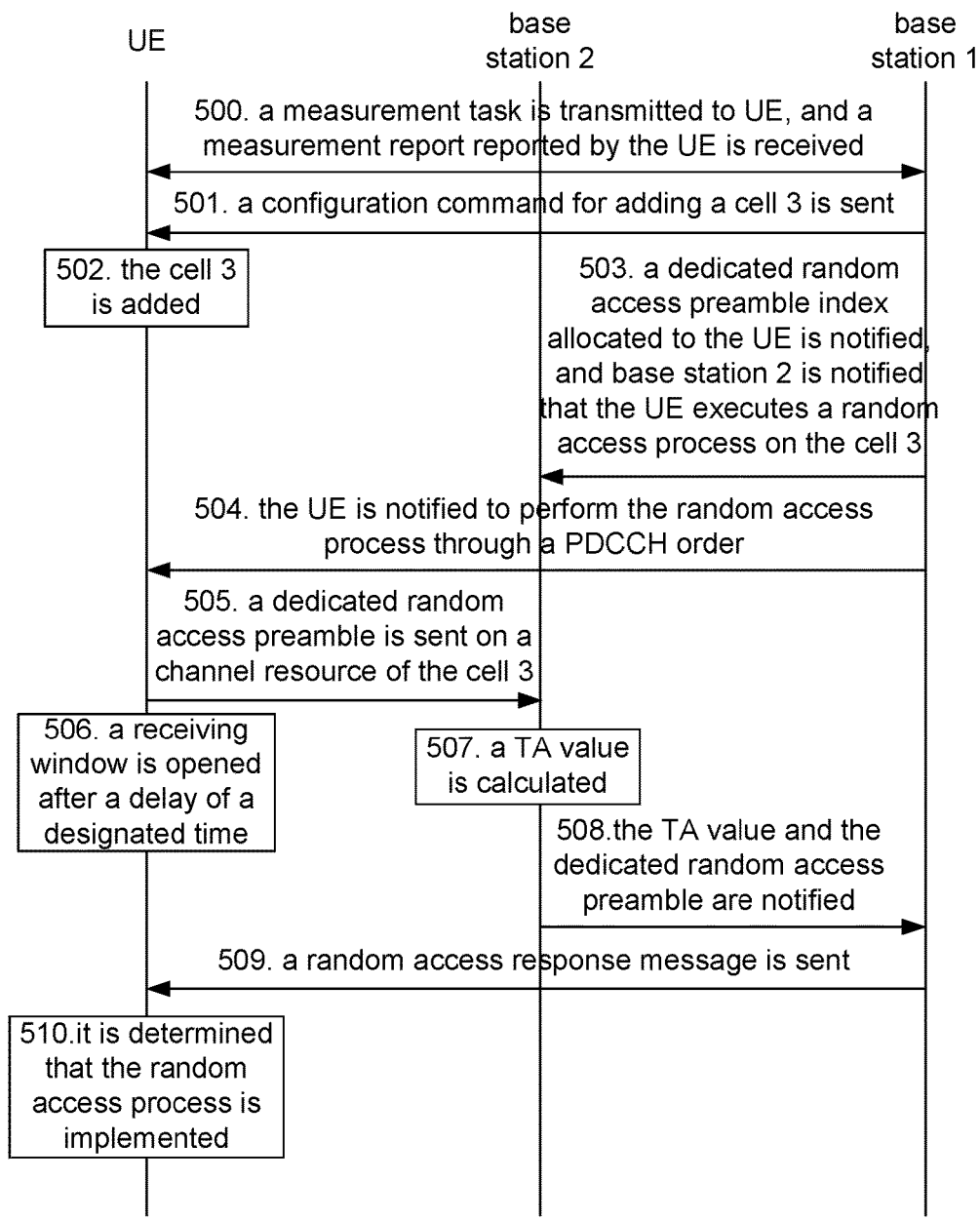
FIG. 5 is a flowchart showing a method for conducting random access on a small cell according to embodiment 5 of the present disclosure.

A method for conducting random access on a small cell in the embodiment, as shown in FIG. 5, includes the following steps:

Step 500: after UE establishes a connection with cell 1, base station 1 to which cell 1 belongs transmits a measurement task to the UE, receives a measurement report reported by the UE, and then executes Step 501.

Step 501: base station 1 sends a configuration command for adding cell 3 to the UE after discovering that service traffic increases and it is necessary to add a cell to the UE according to the measurement report.

Step 502: the UE adds cell 3 after receiving the configuration command.

Here, the step may specifically implemented by adopting the conventional art.

Step 503: base station 1 notifies base station 2 to which cell 3 belongs of a dedicated random access preamble index allocated to the UE, and notifies base station 2 that the UE executes a random access process on cell 3.

Here, the step may be executed together with Step 501 and Step 502.

Step 504: base station 1 notifies the UE to perform the random access process through a PDCCH order.

Here, the PDCCH order contains an identifier of cell 3, which may specifically be a cell identifier or a serving cell identifier or another indication method for indicating cell 3. The PDCCH order also contains the dedicated random access preamble index allocated to the UE, and it is supposed that the dedicated random access preamble index allocated to the UE is 60.

Step 505: the UE sends a dedicated random access preamble corresponding to the dedicated random access preamble index 60 notified by base station 1 to base station 2 on a channel resource of a designated cell, i.e. cell 3, after receiving notification from base station 1, and then executes Step 506.

Step 506: the UE opens a receiving window after a delay of a designated time.

Here, the designated time may be configured by the base station or may be preset to be, for example, 50 ms.

The step is executed to ensure sufficient interaction time for base station 1 and base station 2 to ensure that the UE may smoothly implement the random access process.

Step 507: base station 2 calculates a TA value after receiving the dedicated random access preamble.

Step 508: base station 2 notifies base station 1 of the TA value and the dedicated random access preamble after calculating the TA value.

Step 509: base station 1 sends a random access response message to the UE according to the received dedicated random access preamble after receiving the notification.

Here, the random access response message at least contains the dedicated random access preamble received by base station 2 and the TA value.

Step 510: the UE confirms that the dedicated random access preamble contained in the random access response message is the same as a dedicated random access preamble sent by itself after receiving the random access response message, thereby implementing the random access process.

Here, after the random access process is implemented, the UE may perform uplink data sending on cell 3 by virtue of the TA value.

Embodiment 6

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 6:
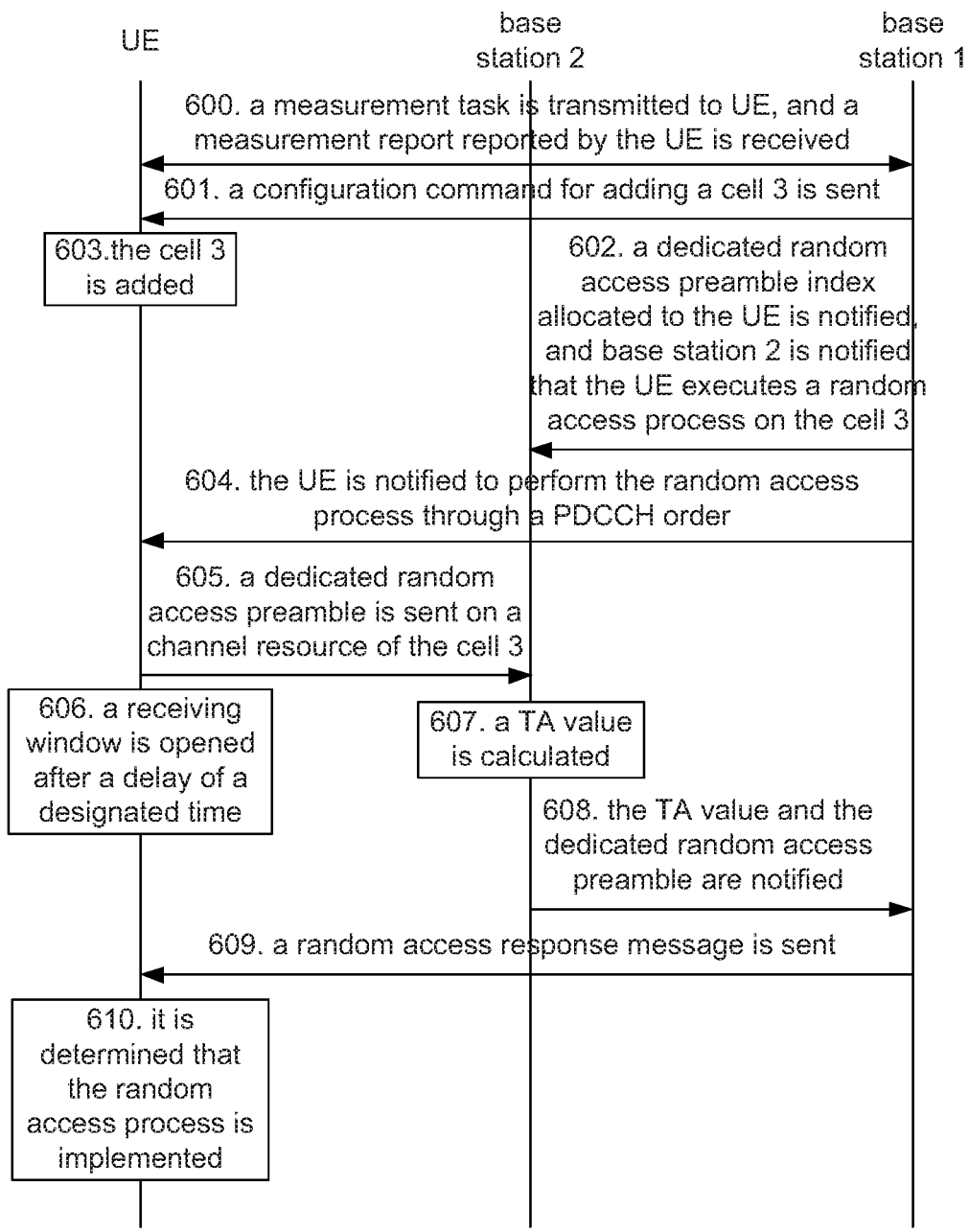
FIG. 6 is a flowchart showing a method for conducting random access on a small cell according to embodiment 6 of the present disclosure.

A method for conducting random access on a small cell in the embodiment, as shown in FIG. 6, includes the following steps:

Step 600: after UE establishes a connection with cell 1, base station 1 to which cell 1 belongs transmits a measurement task to the UE, receives a measurement report reported by the UE, and then executes Step 601.

Step 601: base station 1 sends a configuration command for adding cell 3 to the UE after discovering that service traffic increases and it is necessary to add a cell to the UE according to the measurement report, and simultaneously notifies the UE of an indication that a random access process is required to be executed.

Here, the indication contains an identifier of cell 3 for execution of random access, which may specifically be a cell identifier or a serving cell identifier or another indication method for indicating cell 3, the indication also contains a dedicated random access preamble index allocated to the UE, and it is supposed that the dedicated random access preamble index allocated to the UE is 59.

Step 602: base station 1 notifies base station 2 to which cell 3 belongs of the dedicated random access preamble index allocated to the UE, and notifies base station 2 that the UE executes the random access process on cell 3.

Here, the step may be executed together with Step 601.

Step 603: the UE adds cell 3 after receiving the configuration command, and then executes Step 604.

Here, the step may specifically be implemented by adopting the conventional art.

Step 604: the UE sends a dedicated random access preamble corresponding to the dedicated random access preamble index 59 notified by base station 1 to base station 2 on a channel resource of a designated cell, i.e. cell 3, and then executes Step 605.

Step 605: the UE opens a receiving window after a delay of a designated time.

Here, the designated time may be configured by the base station or may be preset to be, for example, 50 ms.

The step is executed to ensure sufficient interaction time for base station 1 and base station 2 to ensure that the UE may smoothly implement the random access process.

Step 606: base station 2 calculates a TA value after receiving the preamble.

Step 607: base station 2 notifies base station 1 of the TA value and the dedicated random access preamble after calculating the TA value.

Step 608: base station 1 sends a random access response message to the UE according to the received dedicated random access preamble after receiving the notification.

Here, the random access response message at least contains the dedicated random access preamble received by base station 2 and the TA value.

Step 609: the UE confirms that the dedicated random access preamble contained in the random access response message is the same as a dedicated random access preamble sent by itself after receiving the random access response message, thereby implementing the random access process.

Step 610: The UE Determines that the Random Access Process is Implement.

Here, after the random access process is implemented, the UE may send uplink data on cell 3 by virtue of the TA value.

Embodiment 7

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 7:
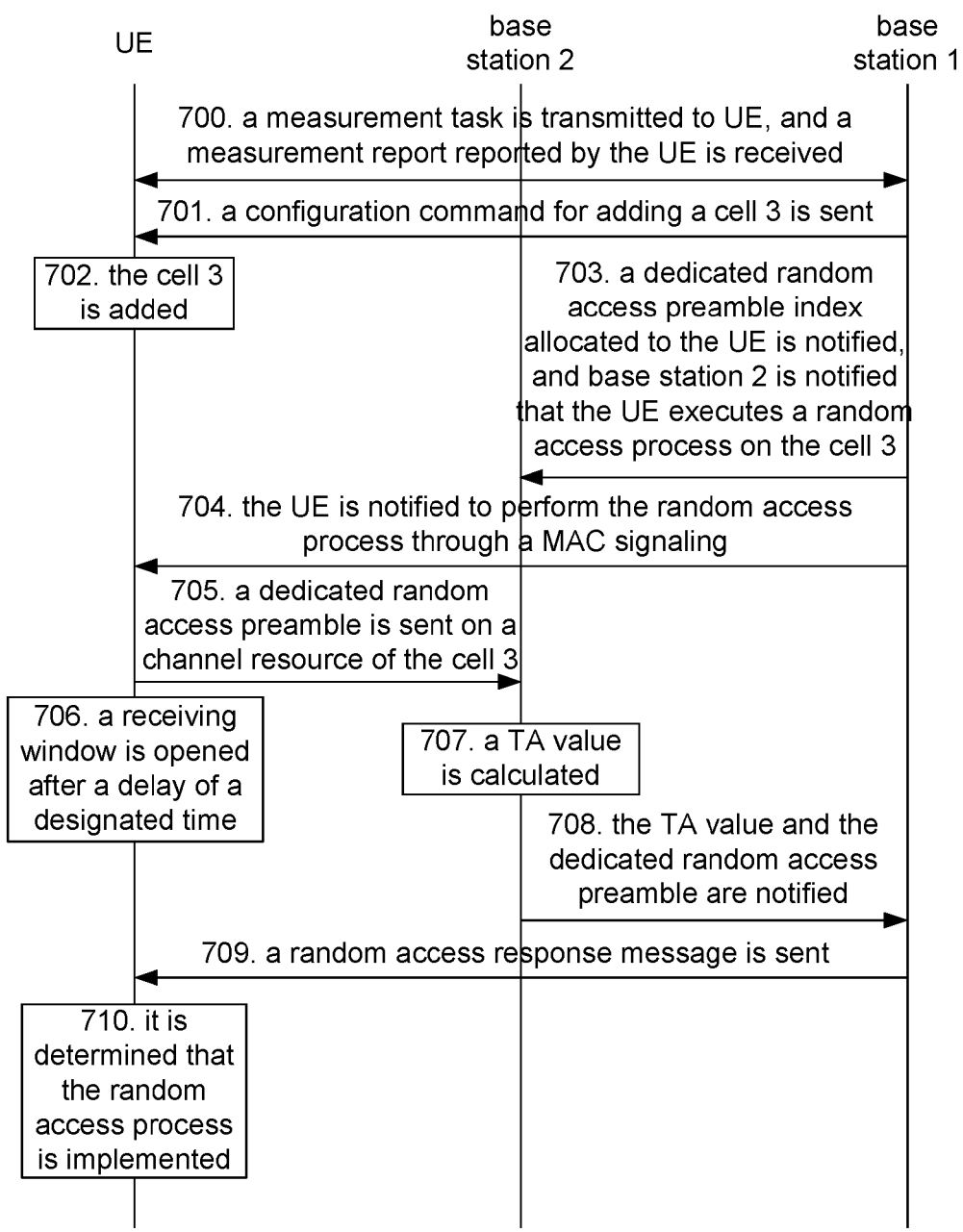
FIG. 7 is a flowchart showing a method for conducting random access on a small cell according to embodiment 7 of the present disclosure.

A method for conducting random access on a small cell in the embodiment, as shown in FIG. 7, includes the following steps:

Step 700: after UE establishes a connection with cell 1, base station 1 to which cell 1 belongs transmits a measurement task to the UE, receives a measurement report reported by the UE, and then executes Step 701.

Step 701: base station 1 sends a configuration command for adding cell 3 to the UE after discovering that service traffic increases and it is necessary to add a cell to the UE according to the measurement report.

Step 702: the UE adds cell 3 after receiving the configuration command.

Here, the step may specifically implemented by adopting the conventional art.

Step 703: base station 1 notifies base station 2 to which cell 3 belongs of a dedicated random access preamble index allocated to the UE and notifies base station 2 that the UE executes a random access process on cell 3.

Here, the step may be executed together with Step 701 and Step 702.

Step 704: base station 1 notifies the UE to perform the random access process through a MAC signalling.

Here, the MAC signalling includes an indication that the random access process is required to be executed. The MAC signalling contains an identifier of cell 3, which may specifically be a cell identifier or a serving cell identifier or another indication method for indicating cell 3. The MAC signalling also contains the dedicated random access preamble index allocated to the UE, and it is supposed that the dedicated random access preamble index allocated to the UE is 59.

Step 705: the UE sends a dedicated random access preamble corresponding to the dedicated random access preamble index 59 notified by base station 1 to base station 2 on a channel resource of a designated cell, i.e. cell 3, after receiving notification from base station 1, and then executes Step 706.

Step 706: the UE opens a receiving window after a delay of a designated time.

Here, the designated time may be configured by the base station or may be preset to be, for example, 50 ms.

The step is executed to ensure sufficient interaction time for base station 1 and base station 2 to ensure that the UE may smoothly implement the random access process.

Step 707: base station 2 calculates a TA value after receiving the dedicated random access preamble.

Step 708: base station 2 notifies base station 1 of the TA value and the dedicated random access preamble after calculating the TA value.

Step 709: base station 1 sends a random access response message to the UE according to the received dedicated random access preamble after receiving the notification.

Here, the random access response message at least contains the dedicated random access preamble received by base station 2 and the TA value.

Step 710: the UE confirms that the dedicated random access preamble contained in the random access response message is the same as a dedicated random access preamble sent by itself after receiving the random access response message, thereby implementing the random access process.

Here, after the random access process is implemented, the UE may send uplink data on cell 3 by virtue of the TA value.

Embodiment 8

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 8:
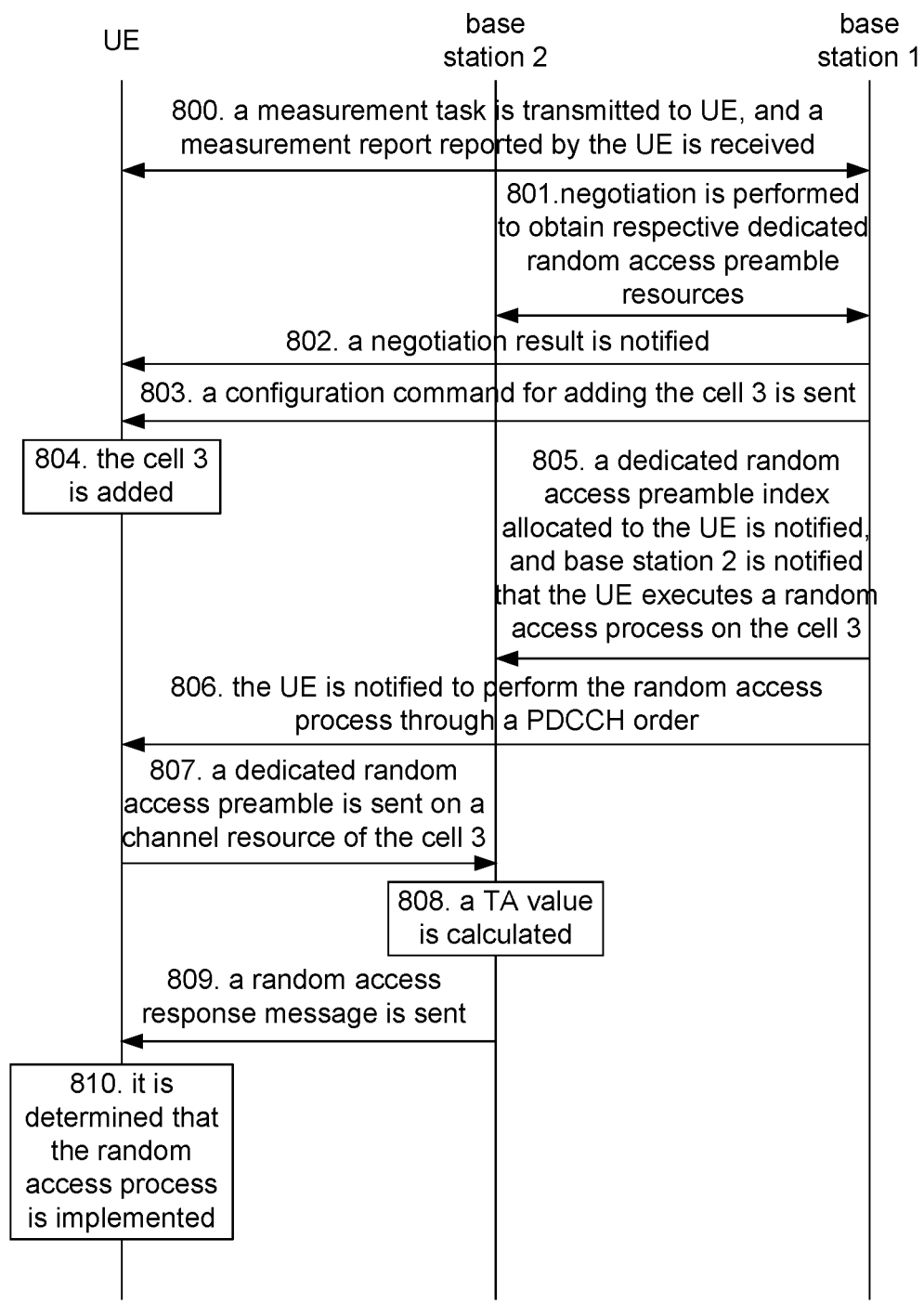
FIG. 8 is a flowchart showing a method for conducting random access on a small cell according to embodiment 8 of the present disclosure.

A method for conducting random access on a small cell in the embodiment, as shown in FIG. 8, includes the following steps:

Step 800: after UE establishes a connection with cell 1, base station 1 to which cell 1 belongs transmits a measurement task to the UE, receives a measurement report reported by the UE, and then executes Step 801.

Step 801: base station 1 negotiates with base station 2 to which a small cell belongs to obtain respective dedicated random access preamble resources.

Here, it is supposed that negotiation determines that: random access preamble indexes 60-63 in random access preamble indexes 56-63 of base station 1 are reserved for base station 2. That is, the UE considers that random access should be initiated on a small cell on base station 2 if the dedicated random access preamble indexes sent on base station 1 are 60-63. Correspondingly, random access preamble indexes 52-55 in dedicated random access preamble indexes of base station 2 are 52-63 are reserved for base station 1. That is, UE considers that random access should be initiated on a small cell on base station 1 if the dedicated random access preamble indexes sent on base station 2 are 52-55.

Step 802: base station 1 notifies the UE of a negotiation result.

Here, base station 1 may notify the UE of the negotiation result through a system message or a dedicated message.

The negotiation result includes respective dedicated random access preamble resources of base station 1 and base station 2.

Step 803: base station 1 sends a configuration command for adding cell 3 to the UE after discovering that service traffic increases and it is necessary to add a cell to the UE according to the measurement report.

Step 804: the UE adds cell 3 after receiving the configuration command.

Here, the step may specifically implemented by adopting the conventional art.

Step 805: base station 1 notifies base station 2 to which cell 3 belongs of a dedicated random access preamble index allocated to the UE, and notifies base station 2 that the UE executes a random access process on cell 3.

Here, the notification includes an identifier of the UE.

The step may be executed together with Step 803 and Step 804.

Step 806: base station 1 notifies the UE to perform the random access process through a PDCCH order.

Here, the PDCCH order contains an identifier of cell 3, which may specifically be a cell identifier or a serving cell identifier or another indication method for indicating cell 3, or, the PDCCH order contains the dedicated random access preamble index allocated to the UE, and it is supposed that the dedicated random access preamble index allocated to the UE is 60.

Step 807: the UE sends a dedicated random access preamble corresponding to the dedicated random access preamble index 60 notified by base station 1 to base station 2 on a channel resource of a designated cell, i.e. cell 3, after receiving notification from base station 1.

Here, when the notification contains the identifier of cell 3, the UE may determine the corresponding dedicated random access preamble according to the received negotiation result; and when the notification contains the dedicated random access preamble index allocated to the UE, the UE may determine that the designated cell is cell 3 according to the received negotiation result.

Step 808: base station 2 calculates a TA value after receiving the dedicated random access preamble.

Step 809: base station 2 sends a random access response message to the UE after calculating the TA value.

Here, the random access response message at least contains the dedicated random access preamble received by base station 2 and the TA value.

Step 810: the UE searches a common search space of cell 3, and confirms that the dedicated random access preamble contained in the random access response message is the same as a dedicated random access preamble sent by itself after receiving the random access response message, thereby implementing the random access process.

Here, after the random access process is implemented, the UE may send uplink data on cell 3 by virtue of the TA value.

Embodiment 9

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 9:
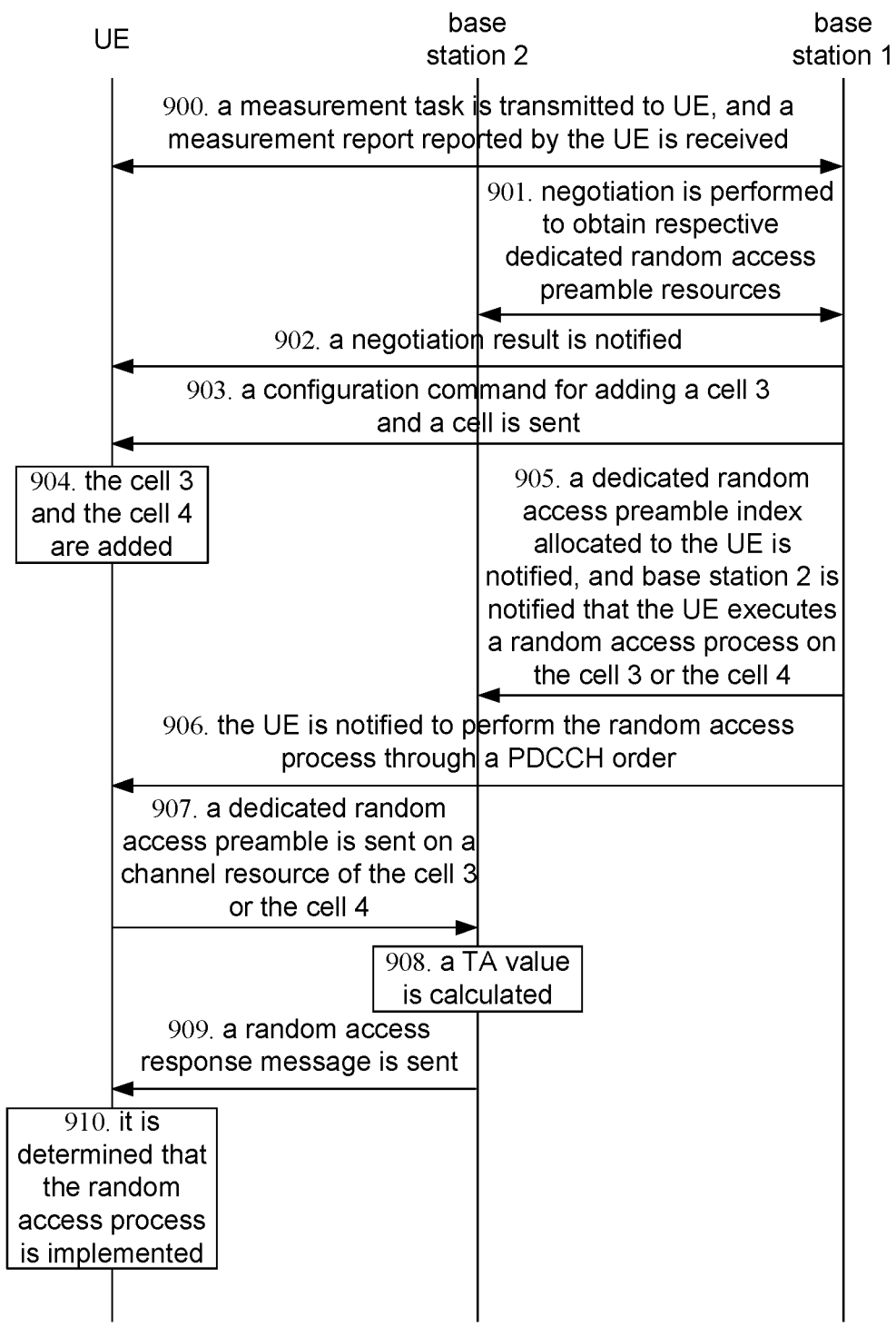
FIG. 9 is a flowchart showing a method for conducting random access on a small cell according to embodiment 9 of the present disclosure.

A method for conducting random access on a small cell in the embodiment, as shown in FIG. 9, includes the following steps:

Step 900: after UE establishes a connection with cell 1, base station 1 to which cell 1 belongs transmits a measurement task to the UE, receives a measurement report reported by the UE, and then executes Step 901.

Step 901: base station 1 negotiates with base station 2 to which a small cell belongs to obtain respective dedicated random access preamble resources.

Here, it is supposed that negotiation determines that: random access preamble indexes 60-63 in random access preamble indexes 56-63 of base station 1 are reserved for base station 2. That is, UE considers that random access should be initiated on a small cell on base station 2 if the dedicated random access preamble indexes sent on base station 1 are 60-63. Correspondingly, random access preamble indexes 52-55 in dedicated random access preamble indexes of base station 2 are 52-63 are reserved for base station 1. That is, UE considers that random access should be initiated on a small cell on base station 1 if the dedicated random access preamble indexes sent on base station 2 are 52-55.

Step 902: base station 1 notifies the UE of a negotiation result.

Here, base station 1 may notify the UE of the negotiation result through a system message or a dedicated message.

The negotiation result includes respective dedicated random access preamble resources of base station 1 and base station 2.

Step 903: base station 1 sends a configuration command for adding cell 3 and cell 4 to the UE after discovering that service traffic increases and it is necessary to add a cell to the UE according to the measurement report.

Here, it is supposed that cell 3 and cell 4 adopt the same TA value.

Step 904: the UE adds cell 3 and cell 4 after receiving the configuration command.

Here, the step may specifically implemented by adopting the conventional art.

Step 905: base station 1 notifies base station 2 to which cell 3 belongs of a dedicated random access preamble index allocated to the UE, and notifies base station 2 that the UE executes a random access process on cell 3 or cell 4.

Here, the notification includes an identifier of the UE.

The step may be executed together with Step 903 and Step 904.

Step 906: base station 1 notifies the UE to perform the random access process on cell 3 or cell 4 through a PDCCH order.

Here, the PDCCH order contains identifiers of cell 3 and cell 4, which may specifically be cell identifiers or serving cell identifiers or another indication method for indicating the cells, or, the PDCCH order contains the dedicated random access preamble index allocated to the UE, and it is supposed that the dedicated random access preamble index allocated to the UE is 60.

Step 907: the UE selects to send a dedicated random access preamble corresponding to the dedicated random access preamble index 60 notified by base station 1 to base station 2 on a channel resource of cell 3 or cell 4, after receiving notification from base station 1.

Here, when the notification contains the identifiers of cell 3 and cell 4, the UE may determine the corresponding dedicated random access preamble according to the received negotiation result; and when the notification contains the dedicated random access preamble index allocated to the UE, the UE may determine that the designated cell is cell 3 or cell 4 according to the received negotiation result.

It is supposed that the UE selects to send the dedicated random access preamble on cell 3.

Step 908: base station 2 calculates a TA value after receiving the dedicated random access preamble.

Step 909: base station 2 sends a random access response message to the UE after calculating the TA value.

Here, the random access response message at least contains the dedicated random access preamble received by base station 2 and the TA value.

Step 910: the UE searches a common search space of cell 3, and confirms that the dedicated random access preamble contained in the random access response message is the same as a dedicated random access preamble sent by itself after receiving the random access response message, thereby implementing the random access process.

Here, since cell 3 and cell 4 correspond to the same TA value, the UE may send uplink data on cell 3 and cell 4 by virtue of the TA value after the random access process is implemented.

Embodiment 10

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 10:
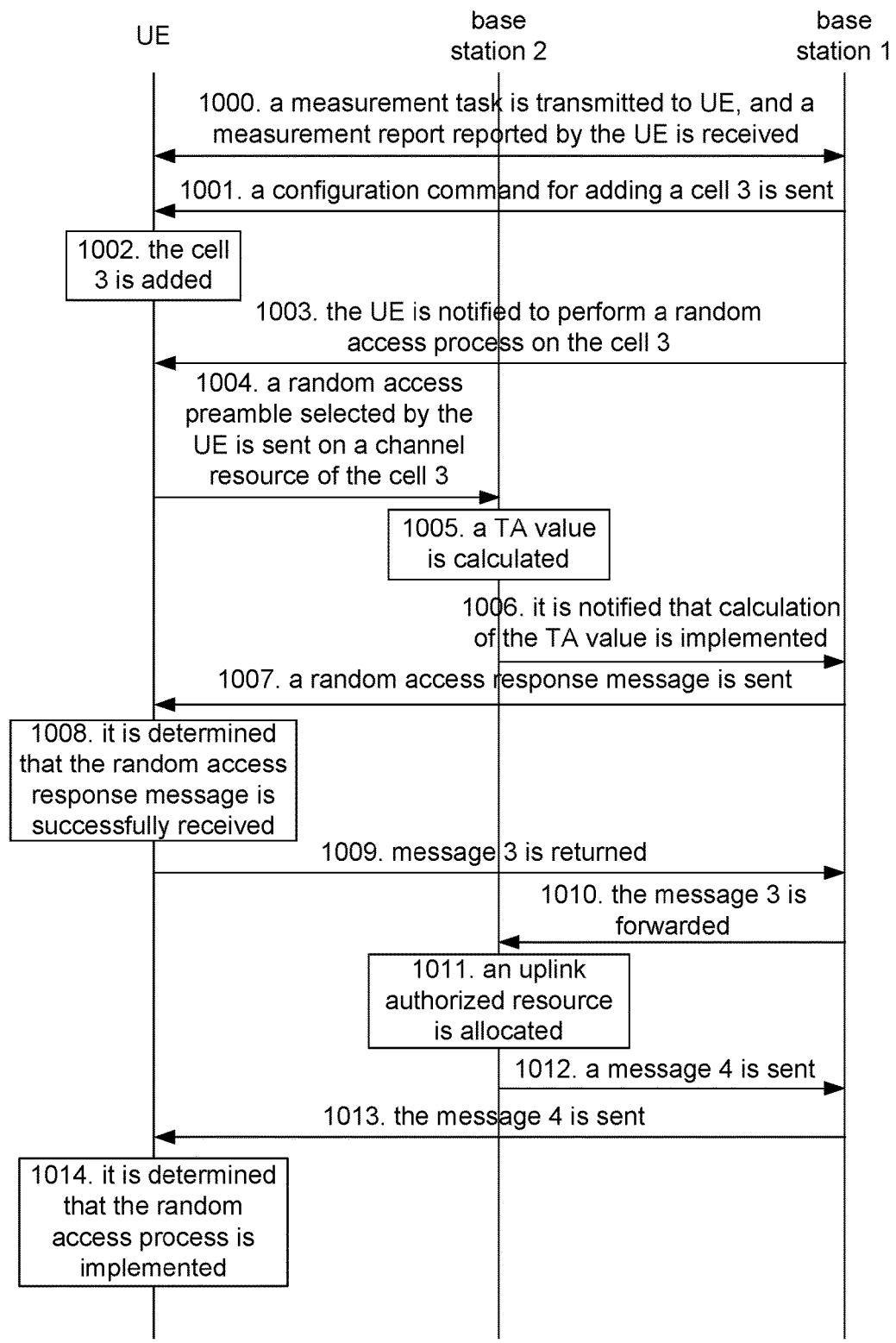
FIG. 10 is a flowchart showing a method for conducting random access on a small cell according to embodiment 10 of the present disclosure.

A method for conducting random access on a small cell in the embodiment, as shown in FIG. 10, includes the following steps:

Step 1000: after UE establishes a connection with cell 1, base station 1 to which cell 1 belongs allocates a Cell-Radio Network Temporary Identifier (C-RNTI) to the UE, transmits a measurement task to the UE, receives a measurement report reported by the UE, and then executes Step 1001.

Here, it is supposed that the allocated C-RNTI is C-RNTI-1.

Step 1001: base station 1 sends a configuration command for adding cell 3 to the UE after discovering that service traffic increases and it is necessary to add a cell to the UE according to the measurement report reported by the UE.

Step 1002: the UE adds cell 3 after receiving the configuration command.

Step 1003: base station 1 notifies the UE to perform a random access process on cell 3.

Here, the notification does not contain a dedicated random access preamble index.

Step 1004: the UE autonomously selects a random access preamble after receiving the notification, and sends the random access preamble selected by itself on a channel resource of cell 3 which is designated.

Here, when the UE discovers that cell 3 is a first cell, configured for itself, on the small cell base station, the UE may autonomously activate cell 3, autonomously select the random access preamble and send the random access preamble selected by itself on the channel resource of cell 3 which is designated, that is, base station 1 is not required to notify the UE to perform the random access process on cell 3, and at this time, Step 1003 is not required to be executed.

Step 1005: base station 2 calculates a TA value after receiving the random access preamble, and allocates a temporary C-RNTI and a temporary uplink authorization identifier to the UE.

Step 1006: base station 2 notifies base station 1 of the temporary C-RNTI and the temporary uplink authorization identifier after implementing allocation.

Here, the notification contains the random access preamble received by base station 2, the TA value, the temporary C-RNTI and temporary uplink authorization identifier allocated to the UE and an identifier of the UE.

Step 1007: base station 1 sends a random access response message to the UE after receiving the notification.

Here, the random access response message at least contains the random access preamble received by base station 2, the TA value, the temporary C-RNTI and temporary uplink authorization identifier allocated to the UE and an identifier of the UE by base station 2 and the identifier of the UE.

Step 1008: the UE confirms that the random access preamble contained in the random access response message is the same as the random access preamble sent by itself after receiving the random access response message, determines that the random access response message is successfully received, and then executes Step 1009.

Step 1009: the UE returns message 3 to base station 1 by adopting C-RNTI-1.

Here, message 3 is configured for scheduled transmission, and is a scheduled transmission message; and message 3 contains a cell identifier of cell 3.

Step 1010: base station 1 forwards message 3 to base station 2 to which cell 3 belongs according to the cell identifier of cell 3 in message 3 after receiving message 3.

Here, message 3 which is forwarded contains C-RNTI-1 and the cell identifier of cell 3.

Step 1011: base station 2 allocates an uplink authorized resource to the UE after receiving message 3.

Step 1012: base station 2 sends message 4 to base station 1.

Here, message 4 sent to base station 1 by base station 2 is configured to resolve a conflict, and is a conflict resolution message; and the message sent to base station 1 by base station 2 contains the uplink authorized resource allocated to the UE, the cell identifier of cell 3 and the identifier of the UE.

Step 1013: base station 1 sends message 4 to the UE by adopting C-RNTI-1 after receiving message 4.

Here, message 4 sent to the UE by base station 1 contains the uplink authorized resource allocated to the UE by base station 2 and the cell identifier of cell 3.

Step 1014: the UE confirms that received message 4 contains the uplink authorized resource allocated to the UE by base station 2 and the cell identifier of cell 3 after receiving message 4, and determines that the random access process is successful.

Here, after the random access process is implemented, the UE may send uplink data on cell 3 by virtue of the TA value.

It is noted that all of the messages in Steps 1009, 1010, 1012 and 1013 may contain the cell identifier of cell 3, which may also be, besides the cell identifier, another identifier capable of indicating that the random access process is performed on cell 3 of base station 2, for example, a serving cell identifier of cell 3 and an identifier of base station 2.

Embodiment 11

An application scenario of the embodiment is that: under dual connectivity, base station 1 is a macro base station, and has a cell, i.e. cell 1, and base station 2 is a small cell base station, and has two cells, i.e. cell 3 and cell 4 respectively, wherein a control connection is established on the macro base station, that is, the control connection is established on base station 1.

Figure 11:
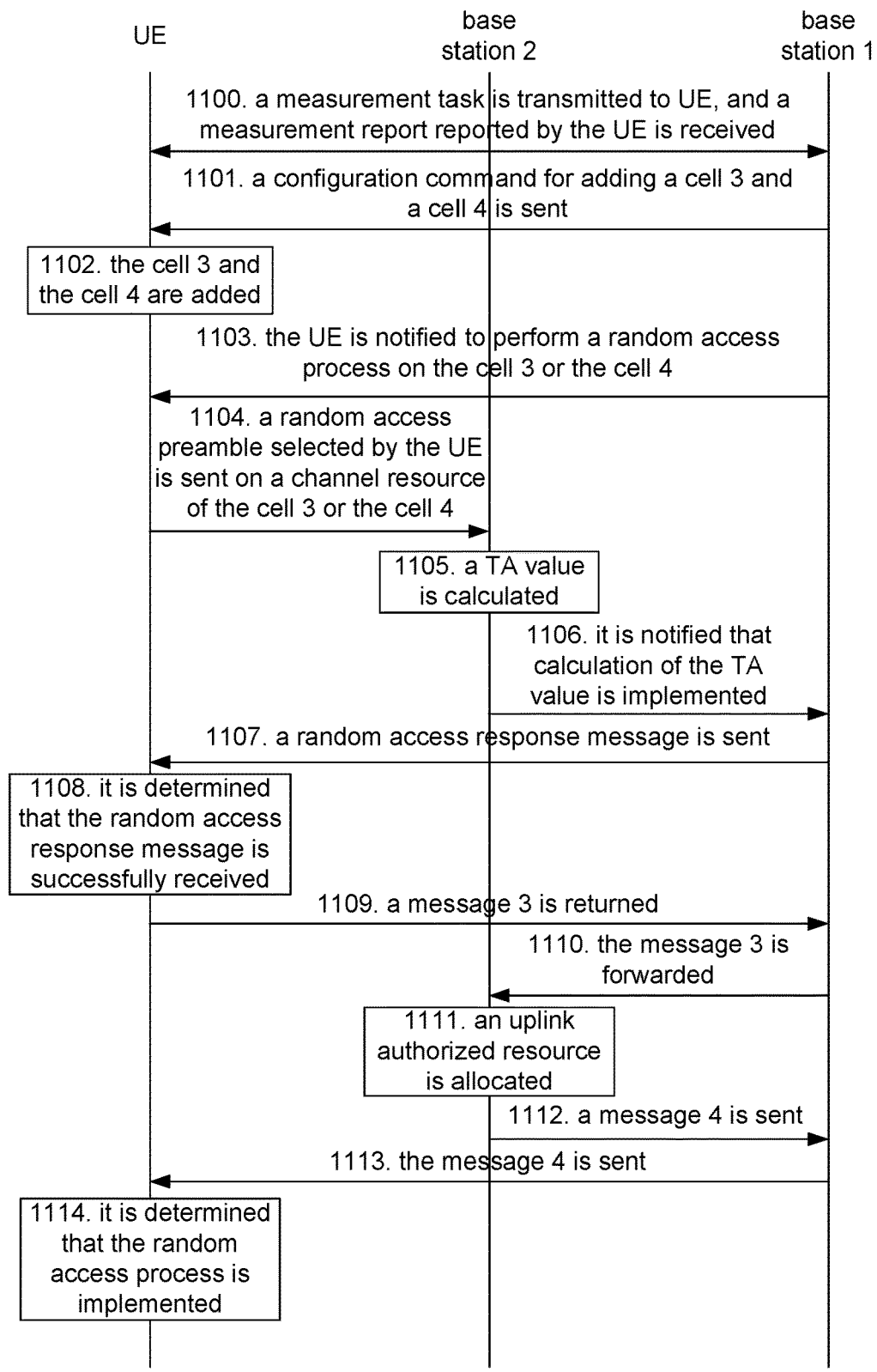
FIG. 11 is a flowchart showing a method for conducting random access on a small cell according to embodiment 11 of the present disclosure.

A method for conducting random access on a small cell in the embodiment, as shown in FIG. 11, includes the following steps:

Step 1100: after UE establishes a connection with cell 1, base station 1 to which cell 1 belongs allocates a C-RNTI to the UE, transmits a measurement task to the UE, receives a measurement report reported by the UE, and then executes Step 1101.

Here, it is supposed that the allocated C-RNTI is C-RNTI-1.

Step 1101: base station 1 sends a configuration command for adding cell 3 and cell 4 to the UE after discovering that service traffic increases and it is necessary to add a cell to the UE according to the measurement report reported by the UE.

Here, it is supposed that cell 3 and cell 4 adopt the same TA value.

Step 1102: the UE adds cell 3 and cell 4 after receiving the configuration command.

Here, the step may specifically be implemented by adopting the conventional art.

Step 1103: base station 1 notifies the UE to perform a random access process on cell 3 or cell 4.

Here, the notification does not contain a dedicated random access preamble index.

Step 1104: the UE autonomously selects a random access preamble after receiving the notification of base station 1, and sends the random access preamble selected by itself on a channel resource of cell 3 or cell 4.

Here, when the UE discovers that it is required to send uplink data on cell 3 or cell 4, the UE may autonomously activate cell 3 or cell 4, autonomously select the random access preamble and send the random access preamble selected by itself on the channel resource of cell 3 or cell 4, that is, base station 1 is not required to notify the UE to perform the random access process on cell 3 or cell 4, and at this time, Step 1103 is not required to be executed.

It is supposed that the UE sends the random access preamble selected by itself on the channel resource of cell 3.

Step 1105: base station 2 calculates a TA value after receiving the random access preamble, and allocates a temporary C-RNTI and a temporary uplink authorization identifier to the UE.

Step 1106: base station 2 notifies base station 1 of the temporary C-RNTI and the temporary uplink authorization identifier after implementing allocation.

Here, the notification contains the random access preamble received by base station 2, the TA value, the temporary C-RNTI and temporary uplink authorization identifier allocated to the UE and an identifier of the UE.

Step 1107: base station 1 sends a random access response message to the UE after receiving the notification.

Here, the random access response message at least contains the random access preamble received by base station 2, the TA value, the temporary C-RNTI and temporary uplink authorization identifier allocated to the UE and an identifier of the UE by base station 2 and the identifier of the UE.

Step 1108: the UE confirms that the random access preamble contained in the random access response message is the same as the random access preamble sent by itself after receiving the random access response message, determines that the random access response message is successfully received, and then executes Step 1109.

Step 1109: the UE returns message 3 to base station 1 by adopting C-RNTI-1.

Here, message 3 is configured for scheduled transmission, and is a scheduled transmission message; and message 3 contains a cell identifier of cell 3.

Step 1110: base station 1 forwards message 3 to base station 2 to which cell 3 belongs according to the cell identifier of cell 3 in message 3 after receiving message 3.

Here, message 3 which is forwarded contains C-RNTI-1 and the cell identifier of cell 3.

Step 1111: base station 2 organizes message 4 after receiving message 3, and allocates an uplink authorized resource to the UE.

Step 1112: base station 2 sends message 4 to base station 1.

Here, message 4 sent to base station 1 by base station 2 is configured to resolve a conflict, and is a conflict resolution message; and the message sent to base station 1 by base station 2 contains the uplink authorized resource allocated to the UE, the cell identifier of cell 3 and the identifier of the UE.

Step 1113: base station 1 sends message 4 to the UE by adopting C-RNTI-1 after receiving message 4.

Here, message 4 sent to the UE by base station 1 contains the uplink authorized resource allocated to the UE by base station 2 and the cell identifier of cell 3.

Step 1114: the UE confirms that received message 4 contains the uplink authorized resource allocated to the UE by base station 2 and the cell identifier of cell 3 after receiving message 4, and determines that the random access process is successful.

Here, since cell 3 and cell 4 correspond to the same TA value, the UE may perform uplink data sending on cell 3 and cell 4 by virtue of the TA value after the random access process is implemented.

It is noted that all of the messages in Steps 1109, 1110, 1112 and 1113 may contain the cell identifier of cell 3, which may also be, besides the cell identifier, another identifier capable of indicating that the random access process is performed on cell 3 of base station 2, for example: a serving cell identifier of cell 3 and an identifier of base station 2.

It is noted that the processes described in embodiment 5 to embodiment 11 are processes of conducting random access on the small cell when the UE establishes data connections with two base stations, and flows of conducting random access on the small cell when the UE establishes data connections with more than three base stations are the same as flows of conducting random access on the small cell when the UE establishes data connections with two base stations, and will not be elaborated herein.

The processes described in embodiment 5 to embodiment 11 are described with establishment of a control connection on a base station to which a macro cell belongs as an example, and in case of role exchange, that is, when the control connection is established on a base station to which a small cell belongs, flows of conducting random access on the small cell is the same as the flows of conducting random access on the small cell when the control connection is established on the base station to which the macro cell belongs, and will not be elaborated herein.

Figure 12:
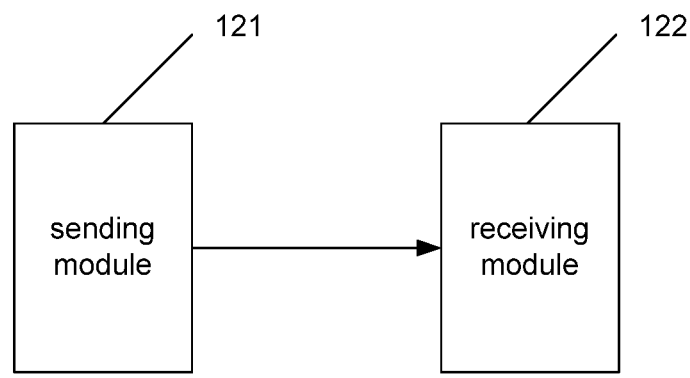
FIG. 12 is a structure diagram illustrating a UE according to an embodiment of the present disclosure.

In order to implement the method in embodiment 1, the embodiments of the present disclosure further provide UE. As shown in FIG. 12, the UE includes a sending module 121 and a receiving module 122.

The sending module 121 is configured to send a dedicated random access preamble corresponding to a designated small cell to a base station to which the designated small cell belongs on the designated small cell.

The receiving module 122 is configured to receive a random access response message sent by a base station to which a master control cell belongs or the base station to which the designated small cell belongs, thereby implementing a random access process.

Here, the UE may further include: a determination module, configured to determine the dedicated random access preamble corresponding to the designated small cell according to a negotiation result between the base station to which the master control cell in dual connectivity belongs and the base station to which the designated small cell belongs and the notified designated small cell; or, determine the designated small cell according to the negotiation result between the base station to which the master control cell in the dual connectivity belongs and the base station to which the designated small cell belongs and a notified dedicated random access preamble parameter corresponding to the dedicated random access preamble.

Herein, the negotiation result includes respective dedicated random access preamble resources of the base station to which the master control cell belongs and the base station to which the designated small cell belongs.

The dedicated random access preamble parameter may specifically be a dedicated random access preamble index or the like.

Here, the receiving module 122 may acquire the dedicated random access preamble corresponding to the dedicated random access preamble parameter according to the conventional art.

During a practical application, the sending module 121 may be implemented by a transmitter in the UE, the receiving module 122 may be implemented by a receiver in the UE, and the determination module may be implemented by a Central Processing Unit (CPU), Digital Signal Processor (DSP) or Field-Programmable Gate Array (FPGA) in the UE.

Figure 13:
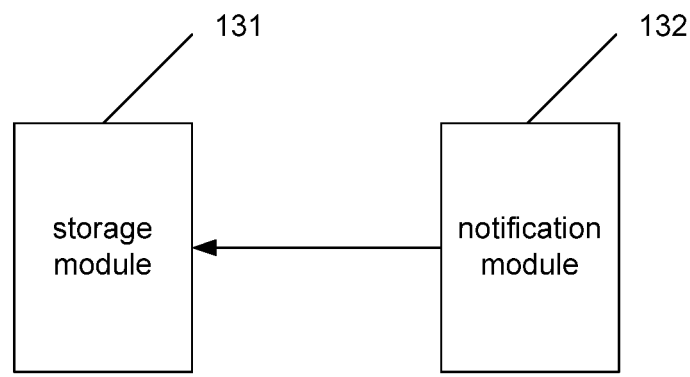
FIG. 13 is a structure diagram illustrating a base station according to an embodiment of the present disclosure.

In order to implement the method in embodiment 2, the embodiments of the present disclosure further provide a base station. As shown in FIG. 13, the base station is a base station to which a master control cell in dual connectivity belongs, and the base station includes a storage module 131 and a notification module 132.

The storage module 131 is configured to store related information of a designated cell, for example: a dedicated random access preamble parameter corresponding to a dedicated random access preamble of the designated cell.

The notification module 132 is configured to notify UE to initiate a random access process on a designated small cell, and/or notify a dedicated random access preamble parameter corresponding to a dedicated random access preamble of the designated small cell.

Here, the dual connectivity refers to that the UE keeps data connections with more than two different cells which belong to different base stations at the same time.

The master control cell is responsible for controlling and managing multiple established data connections to ensure data transmission speed and correctness.

The notification module 132 is specifically configured to: notify the UE to initiate the random access process on the designated small cell, and/or notify the dedicated random access preamble parameter corresponding to the dedicated random access preamble by the base station to which the master control cell belongs through a PDCCH order, a MAC signalling or an RRC signalling.

The notification module 132 is specifically configured to: send to the UE a negotiation result including respective dedicated random access preamble resources of the base station to which the master control cell belongs and a base station to which the designated small cell belongs, wherein the dedicated random access preamble parameter may specifically be a dedicated random access preamble index or the like.

The notification module 132 is further configured to notify the base station to which the designated small cell belongs of that the UE initiates the random access process on the designated small cell and of the corresponding dedicated random access preamble parameter.

During a practical application, the storage module 131 may be implemented by a memory in the base station, and the notification module 132 may be implemented by a transmitter in the base station.

Figure 14:
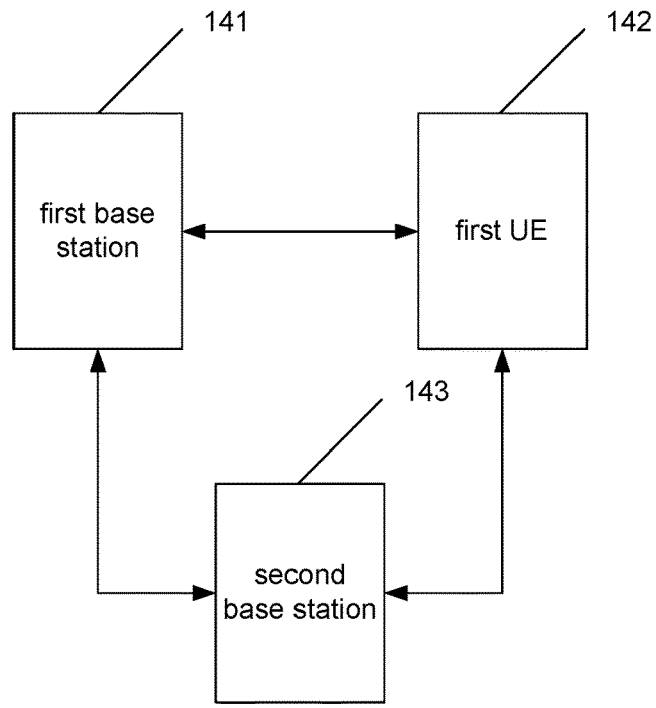
FIG. 14 is a structure diagram illustrating a system for conducting random access on a small cell under dual connectivity according to an embodiment of the present disclosure.

In order to implement the method in embodiment 3, the embodiments of the present disclosure further provide a system for conducting random access on a small cell under dual connectivity, and as shown in FIG. 14, the system includes a first base station 141, first UE 142 and a second base station 143.

The first base station 141 is a base station to which a master control cell in dual connectivity belongs, and is configured to notify the first UE 142 to initiate a random access process on a designated small cell, and/or notify a dedicated random access preamble parameter corresponding to a dedicated random access preamble.

The first UE 142 is configured to send the dedicated random access preamble corresponding to the designated small cell to the second base station 143 to which the designated small cell belongs on the designated small cell after receiving the notification of the first base station 141, and is configured to receive a random access response message sent by the first base station 141 or the second base station 143, thereby implementing the random access process.

In an embodiment, a notification module of the first base station 141 may notify the first UE 142 to initiate the random access process on the designated small cell, and/or notify the dedicated random access preamble parameter corresponding to the dedicated random access preamble.

In an embodiment, a sending module of the first UE 142 may send the dedicated random access preamble corresponding to the designated small cell to the second base station 143 to which the designated small cell belongs on the designated small cell; and a receiving module of the first UE 142 may receive the random access response message sent by the first base station 141 or the second base station 143, thereby implementing the random access process.

Herein, when the first base station 141 notifies the first UE 142 to initiate the random access process on the designated small cell, and/or notifies the first UE 142 of the dedicated random access preamble parameter corresponding to the dedicated random access preamble, the first base station 141 is further configured to negotiate with the second base station 143 to obtain respective dedicated random access preamble parameters, and send a negotiation result to the first UE 142.

Correspondingly, the first UE 142 is further configured to, before sending the dedicated random access preamble corresponding to the designated small cell to the base station to which the designated small cell belongs on the designated small cell, determine the dedicated random access preamble corresponding to the designated small cell according to the negotiation result and the notified designated small cell; or, determine the designated small cell according to the negotiation result and the notified dedicated random access preamble parameter corresponding to the dedicated random access preamble.

In an embodiment, a determination module of the first UE 142 may determine the dedicated random access preamble corresponding to the designated small cell according to the negotiation result and the notified designated small cell; or, determine the designated small cell according to the negotiation result and the notified dedicated random access preamble parameter corresponding to the dedicated random access preamble.

Herein, the negotiation result includes respective dedicated random access preamble resources of the base station to which the master control cell belongs and the base station to which the designated small cell belongs.

Herein, the dedicated random access preamble parameter may specifically be a dedicated random access preamble index or the like.

Here, the UE may acquire the dedicated random access preamble corresponding to the dedicated random access preamble parameter according to the conventional art.

The first base station 141 is further configured to notify that the first UE 142 initiates the random access process on the designated small cell and the corresponding dedicated random access preamble parameter to the second base station 143.

The second base station 143 is configured to calculate a TA value after receiving the dedicated random access preamble sent by the first UE 142, and notify the first base station 141 of the TA value after calculation.

The first base station 141 is further configured to send the random access response message to the first UE 142 after receiving the notification of the second base station 143.

The second base station 143 is further configured to calculate a TA value after receiving the dedicated random access preamble sent by the first UE 142, and send the random access response message to the first UE 142 after calculation.

Here, specific processing processes of the first base station and the second base station in the system according to the embodiments of the present disclosure have been described above in detail, and will not be elaborated herein.

Figure 15:
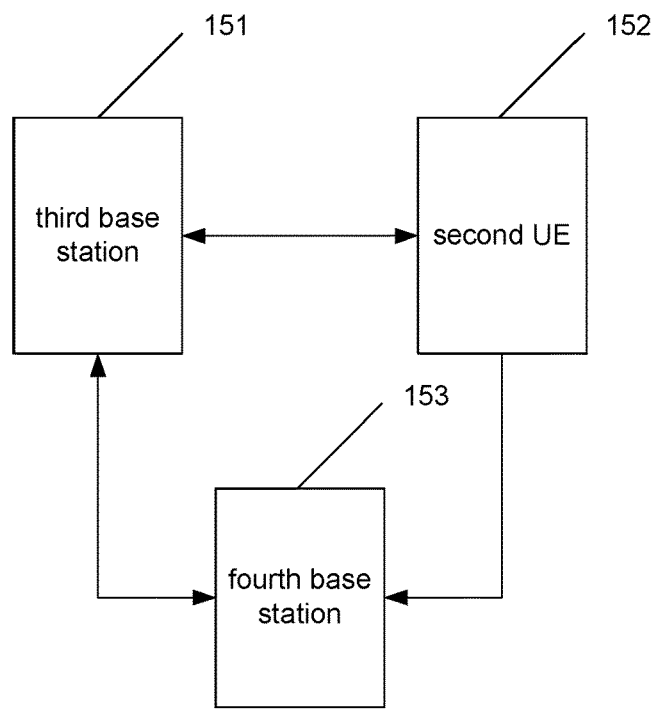
FIG. 15 is a structure diagram illustrating another system for conducting random access on a small cell under dual connectivity according to an embodiment of the present disclosure.

In order to implement the method in the embodiments, the embodiments of the present disclosure further provide another system for conducting random access on a small cell under dual connectivity. As shown in FIG. 15, the system includes a third base station 151, second UE 152 and a fourth base station 153.

The second UE 152 is configured to send a dedicated random access preamble selected by itself to the fourth base station 153 to which a designated small cell belongs on the designated small cell, send a scheduled transmission message to the fourth base station 153 through the third base station 151 after receiving a random access response message sent by the third base station 151 to which a master control cell in dual connectivity belongs, and receive a conflicting resolution message returned by the fourth base station 153.

The fourth base station 153 is configured to return the conflicting resolution message to the second UE 152 through the third base station 151.

The third base station 151 is configured to notify the second UE 152 to initiate a random access process on the designated small cell.

Correspondingly, the second UE 152 is configured to send the dedicated random access preamble selected by itself to the fourth base station 153 on the designated small cell after receiving the notification sent by the third base station 151.

Here, specific processing processes of the third base station and the fourth base station in the system according to the embodiments of the present disclosure have been described above in detail, and will not be elaborated herein.

Those skilled in the art should know that the embodiments of the present disclosure may be provided as a method, a system or a computer program product. Therefore, the present disclosure may adopt a form of pure hardware, pure software or combined software and hardware. Moreover, the present disclosure may adopt a form of computer program product implemented on one or more computer-available storage media (including, but not limited to, a disk memory, a Compact Disc Read-Only Memory (CD-ROM) and an optical memory) including computer-available program codes.

The present disclosure is described with reference to flowcharts and/or block diagrams of the method, equipment (system) and computer program product according to the embodiment of the present disclosure. It should be understood that each flow and/or block in the flowcharts and/or the block diagrams and combinations of the flows and/or blocks in the flowcharts and/or the block diagrams may be implemented by computer program instructions. These computer program instructions may be provided for a universal computer, a dedicated computer, an embedded processor or a processor of other programmable data processing equipment to generate a machine, so that a device for realizing a function designated in one flow or more flows in the flowcharts and/or one block or more blocks in the block diagrams is generated by the instructions executed through the computer or the processor of the other programmable data processing equipment.

These computer program instructions may also be stored in a computer-readable memory capable of guiding the computer or the other programmable data processing equipment to work in a specific manner, so that a product including an instruction device may be generated by the instructions stored in the computer-readable memory, the instruction device realizing the function designated in one flow or many flows in the flowcharts and/or one block or many blocks in the block diagrams.

These computer program instructions may further be loaded onto the computer or the other programmable data processing equipment, so that a series of operating steps are executed on the computer or the other programmable data processing equipment to generate processing implemented by the computer, and steps for realizing the function designated in one flow or many flows in the flowcharts and/or one block or many blocks in the block diagrams are provided by the instructions executed on the computer or the other programmable data processing equipment.

The above is only the preferred embodiment of the present disclosure and not intended to limit the scope of protection of the present disclosure.

The invention claimed is:

1. A method for conducting random access on a small cell under dual connectivity, comprising:
   sending on a designated small cell, by a User Equipment (UE), a dedicated random access preamble corresponding to the designated small cell to a base station to which the designated small cell belongs;
   receiving, by the UE, a random access response message sent by a base station to which a master control cell in the dual connectivity belongs or the base station to which the designated small cell belongs;
   sending, by the UE, a scheduled transmission message to the base station to which the designated small cell belongs through the base station to which the master control cell in the dual connectivity belongs; and
   receiving, by the UE, a conflicting resolution message returned from the base station to which the designated small cell belongs through the base station to which the master control cell in the dual connectivity belongs;
   wherein sending, by the UE, the scheduled transmission message to the base station to which the designated small cell belongs through the base station to which the master control cell in the dual connectivity belongs comprises:
      forwarding, by the base station to which the master control cell in the dual connectivity belongs, the scheduled transmission message to the base station to which the designated small cell belongs according to an identifier of the designated small cell in the scheduled transmission message.

2. The method according to claim 1, further comprising:
   before sending on the designated small cell, by the UE, the dedicated random access preamble corresponding to the designated small cell to the base station to which the designated small cell belongs,
      determining, by the UE, the dedicated random access preamble corresponding to the designated small cell according to a negotiation result between the base station to which the master control cell in the dual connectivity belongs and the base station to which the designated small cell belongs and the designated small cell; or,
      determining, by the UE, the designated small cell according to the negotiation result between the base station to which the master control cell in the dual connectivity belongs and the base station to which the designated small cell belongs and a notified dedicated random access preamble parameter corresponding to the dedicated random access preamble, wherein
         the negotiation result comprises respective dedicated random access preamble resources of the base station to which the master control cell in dual connectivity belongs and the base station to which the designated small cell belongs.

3. A method for conducting random access on a small cell under dual connectivity, comprising:
   notifying, by a base station to which a master control cell in the dual connectivity belongs, a User Equipment (UE) to initiate a random access process on a designated small cell, wherein the random access process comprises notifying a dedicated random access preamble parameter corresponding to a dedicated random access preamble of the designated small cell;
   sending, by the base station to which the master control cell in the dual connectivity belongs, a scheduled transmission message to a base station to which the designated small cell belongs after the base station to which the master control cell in the dual connectivity belongs sends a random access response message to the UE; and
   returning, by the base station to which the master control cell in the dual connectivity belongs, a conflicting resolution message to the UE;
   wherein sending, by the base station to which the master control cell in the dual connectivity belongs, the scheduled transmission message to the base station to which the designated small cell belongs comprises:
      forwarding, by the base station to which the master control cell in the dual connectivity belongs, the scheduled transmission message to the base station to which the designated small cell belongs according to an identifier of the designated small cell in the scheduled transmission message.

4. The method according to claim 3, wherein notifying, by the base station to which the master control cell in the dual connectivity belongs, the UE to initiate the random access process on the designated small cell comprises:
   notifying, by the base station to which the master control cell in the dual connectivity belongs, the UE to initiate the random access process on the designated small cell through a Physical Downlink Control Channel (PDCCH) order, a Medium Access Control (MAC) signalling or a Radio Resource Control (RRC) signalling.

5. The method according to claim 3, further comprising:
   before notifying, by the base station to which the master control cell in the dual connectivity belongs, the UE to initiate the random access process on the designated small cell,
   sending, by the base station to which the master control cell in the dual connectivity belongs, a negotiation result comprising respective dedicated random access preamble resources of the base station to which the master control cell in the dual connectivity belongs and the base station to which the designated small cell belongs to the UE.

6. The method according to claim 3, further comprising:
   notifying the base station to which the designated small cell belongs, by the base station to which the master control cell in the dual connectivity belongs, of the UE initiating the random access process on the designated small cell.

7. The method according to claim 3, wherein the dedicated random access preamble parameter is a dedicated random access preamble index.

8. The method according to claim 1, further comprising:
   before receiving, by the UE, the random access response message sent by the base station to which the master control cell in the dual connectivity belongs or the base station to which the designated small cell belongs, calculating, by the base station to which the designated small cell belongs, a Time Advance (TA) value after receiving the dedicated random access preamble, and notifying, of the TA value, the base station to which the master control cell in the dual connectivity belongs after calculating, by the base station to which the designated small cell belongs, the TA value, and sending, by the base station to which the master control cell in the dual connectivity belongs, the random access response message to the UE after receiving the notification; or, calculating, by the base station to which the designated small cell belongs, a TA value after receiving the dedicated random access preamble, and sending the random access response message to the UE after calculating, by the base station to which the designated small cell belongs, a TA value.

9. A method for conducting random access on a small cell under dual connectivity, comprising:

sending on a designated small cell, by a User Equipment (UE), a dedicated random access preamble selected by the UE to a base station to which the designated small cell belongs;

sending, by the UE, a scheduled transmission message to the base station to which the designated small cell belongs through a base station to which a master control cell in the dual connectivity belongs after the UE receives a random access response message sent by the base station to which the master control cell in the dual connectivity belongs; and returning, by the base station to which the designated small cell belongs, a conflicting resolution message to the UE through the base station to which the master control cell in the dual connectivity belongs;

wherein sending, by the UE, the scheduled transmission message to the base station to which the designated small cell belongs through the base station to which the master control cell in the dual connectivity belongs comprises:

forwarding, by the base station to which the master control cell in the dual connectivity belongs, the scheduled transmission message to the base station to which the designated small cell belongs according to an identifier of the designated small cell in the scheduled transmission message.

10. The method according to claim 9, further comprising:
before sending on the designated small cell, by the UE, the dedicated random access preamble selected by the UE to the base station to which the designated small cell belongs, notifying, by the base station to which the master control cell in the dual connectivity belongs, the UE to initiate a random access process on the designated small cell.

11. The method according to claim 10, wherein notifying, by the base station to which the master control cell in the dual connectivity belongs, the UE to initiate the random access process on the designated small cell comprises:

notifying, by the base station to which the master control cell in the dual connectivity belongs, the UE to initiate the random access process on the designated small cell through a Physical Downlink Control Channel (PDCCH) order, a Medium Access Control (MAC) signalling or a Radio Resource Control (RRC) signalling.

12. The method according to claim 9, wherein returning, by the base station to which the designated small cell belongs, the conflicting resolution message to the UE through the base station to which the master control cell in the dual connectivity belongs comprises:

sending, by the base station to which the designated small cell belongs, the conflicting resolution message to the base station to which the master control cell in the dual connectivity belongs after the conflicting resolution message is generated; and forwarding, by the base station to which the master control cell in the dual connectivity belongs, the conflicting resolution message to the UE according to an identifier of the designated small cell and an identifier of the UE in the conflicting resolution message.

13. A User Equipment (UE), comprising: a processor and a memory for storing instructions executed by the processor, wherein the processor is configured to execute the instructions to:

send a dedicated random access preamble corresponding to a designated small cell to a base station to which the designated small cell belongs on the designated small cell;

receive a random access response message sent by a base station to which a master control cell in the dual connectivity belongs or the base station to which the designated small cell belongs;

send a scheduled transmission message to the base station to which the designated small cell belongs through the base station to which the master control cell in the dual connectivity belongs; and receive a conflicting resolution message returned from the base station to which the designated small cell belongs through the base station to which the master control cell in the dual connectivity belongs;

wherein sending the scheduled transmission message to the base station to which the designated small cell belongs through the base station to which the master control cell in the dual connectivity belongs comprises:

forwarding, by the base station to which the master control cell in the dual connectivity belongs, the scheduled transmission message to the base station to which the designated small cell belongs according to an identifier of the designated small cell in the scheduled transmission message.

14. The UE according to claim 13, wherein the processor is further configured to execute the instructions to:

determine the dedicated random access preamble corresponding to the designated small cell according to a negotiation result between the base station to which the master control cell in the dual connectivity belongs and the base station to which the designated small cell belongs and the designated small cell; or, determine the designated small cell according to the negotiation result between the base station to which the master control cell in the dual connectivity belongs and the base station to which the designated small cell belongs and a notified dedicated random access preamble parameter corresponding to the dedicated random access preamble, wherein the negotiation result comprises respective dedicated random access preamble resources of the base station to which the master control cell in the dual connectivity belongs and the base station to which the designated small cell belongs.

15. A base station to which a master control cell in dual connectivity belongs, comprising a processor and a memory for storing instructions executed by the processor, wherein the processor is configured to execute the instructions to:

notify a User Equipment (UE) to initiate a random access process on a designated small cell, wherein the random access process comprises notifying a dedicated random access preamble parameter corresponding to a dedicated random access preamble of the designated small cell;

send a scheduled transmission message to a base station to which the designated small cell belongs after the base station to which the master control cell in the dual connectivity belongs sends a random access response message to the UE; and return a conflicting resolution message to the UE;

wherein sending the scheduled transmission message to the base station to which the designated small cell belongs comprises:

forwarding, by the base station to which the master control cell in the dual connectivity, the scheduled transmission message to the base station to which the designated small cell belongs according to an identifier of the designated small cell in the scheduled transmission message.

16. The base station according to claim 15, wherein the processor is further configured execute the instructions to send, to the UE, a negotiation result comprising respective dedicated random access preamble resources of the base station to which the master control cell in the dual connectivity belongs and the base station to which the designated small cell belongs.

17. The base station according to claim 15, wherein the processor is further configured to execute the instructions to notify the base station to which the designated small cell belongs of the UE initiating the random access process on the designated small cell.

18. A non-transitory computer storage medium, comprising a set of instructions configured to, when being executed, cause at least one processor to execute a method for conducting random access on a small cell under dual connectivity, wherein the method comprises:

sending on a designated small cell, by a User Equipment (UE), a dedicated random access preamble selected by the UE to a base station to which the designated small cell belongs;

sending, by the UE, a scheduled transmission message to the base station to which the designated small cell belongs through the base station to which the master control cell in the dual connectivity belongs after the UE receives a random access response message sent by the base station to which the master control cell in the dual connectivity belongs; and returning, by the base station to which the designated small cell belongs, a conflicting resolution message to the UE through the base station to which the master control cell in the dual connectivity belongs;

wherein sending, by the UE, the scheduled transmission message to the base station to which the designated small cell belongs through the base station to which the master control cell in the dual connectivity belongs comprises:

forwarding, by the base station to which the master control cell in the dual connectivity belongs, the scheduled transmission message to the base station to which the designated small cell belongs according to an identifier of the designated small cell in the scheduled transmission message.

\* \* \* \* \*